United States Patent
Cui et al.

(10) Patent No.: US 9,590,843 B2
(45) Date of Patent: Mar. 7, 2017

(54) METHOD AND SYSTEM FOR PROVIDING DISTRIBUTED MANAGEMENT IN A NETWORKED VIRTUALIZATION ENVIRONMENT

(71) Applicant: Nutanix, Inc., San Jose, CA (US)

(72) Inventors: Miao Cui, Sunnyvale, CA (US); Gregory Andrew Smith, Oakland, CA (US); Binny Sher Gill, San Jose, CA (US)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 14/206,869

(22) Filed: Mar. 12, 2014

(65) Prior Publication Data

US 2016/0204977 A1 Jul. 14, 2016

(51) Int. Cl.
*G06F 9/44* (2006.01)
*G06F 11/20* (2006.01)
*H04L 12/24* (2006.01)
*G06F 11/16* (2006.01)

(52) U.S. Cl.
CPC .......... *H04L 41/0668* (2013.01); *G06F 11/16* (2013.01)

(58) Field of Classification Search
None
See application file for complete search history.

(56) References Cited

U.S. PATENT DOCUMENTS

| | | | |
|---|---|---|---|
| 5,253,252 A | 10/1993 | Tobol | |
| 5,884,308 A | 3/1999 | Foulston | |
| 6,363,416 B1 | 3/2002 | Naeimi et al. | |
| 6,684,397 B1 | 1/2004 | Byer et al. | |
| 6,738,801 B1 | 5/2004 | Kawaguchi et al. | |
| 6,928,589 B1 | 8/2005 | Pomaranski et al. | |
| 7,379,419 B2 | 5/2008 | Collins | |
| 7,421,578 B1 | 9/2008 | Huang et al. | |
| 7,461,374 B1 | 12/2008 | Balint et al. | |
| 7,720,864 B1 | 5/2010 | Muth et al. | |
| 7,934,117 B2 | 4/2011 | Kakivaya et al. | |
| 7,937,455 B2 | 5/2011 | Saha et al. | |
| 7,990,962 B2 | 8/2011 | Chang et al. | |
| 8,051,252 B2 | 11/2011 | Williams | |
| 8,051,262 B2 | 11/2011 | Ichikawa et al. | |
| 8,424,003 B2 | 4/2013 | Degenaro et al. | |
| 8,473,775 B1 | 6/2013 | Helmick | |
| 8,549,518 B1 | 10/2013 | Aron | |
| 8,601,471 B2 | 12/2013 | Beaty | |
| 8,601,473 B1 | 12/2013 | Aron et al. | |
| 8,898,668 B1 | 11/2014 | Costea | |

(Continued)

FOREIGN PATENT DOCUMENTS

WO WO 2014200564 A1 12/2014

OTHER PUBLICATIONS

PCT International Search Report and Written Opinion for International Appln. No. PCT/US2015/020139, Applicant Nutanix, Inc., Forms PCT/ISA/210, 220, and 237, dated Jun. 15, 2015 (9 pages).

(Continued)

*Primary Examiner* — Brandon Renner
(74) *Attorney, Agent, or Firm* — Vista IP Law Group, LLP

(57) ABSTRACT

A method for handling failure in a networked virtualization environment having distributed virtual machine management.

27 Claims, 24 Drawing Sheets

(56) References Cited

U.S. PATENT DOCUMENTS

| | | | |
|---|---|---|---|
| 9,032,248 B1* | 5/2015 | Petty | G06F 11/2038 |
| | | | 714/11 |
| 9,286,344 B1 | 3/2016 | Bhardwaj et al. | |
| 2002/0133491 A1 | 9/2002 | Sim et al. | |
| 2005/0268298 A1 | 12/2005 | Hunt et al. | |
| 2009/0113034 A1 | 4/2009 | Krishnappa et al. | |
| 2010/0262717 A1 | 10/2010 | Critchley | |
| 2011/0184993 A1 | 7/2011 | Chawla | |
| 2012/0078948 A1 | 3/2012 | Darcy | |
| 2012/0233608 A1 | 9/2012 | Toeroe | |
| 2012/0254342 A1 | 10/2012 | Evans | |
| 2012/0266231 A1 | 10/2012 | Spiers et al. | |
| 2012/0317142 A1 | 12/2012 | Broecheler et al. | |
| 2013/0036323 A1 | 2/2013 | Goose et al. | |
| 2013/0138995 A1 | 5/2013 | Sivaramakrishnan et al. | |
| 2013/0174246 A1 | 7/2013 | Schrecker et al. | |
| 2013/0219030 A1 | 8/2013 | Szabo | |
| 2013/0227550 A1* | 8/2013 | Weinstein et al. | 718/1 |
| 2013/0304694 A1 | 11/2013 | Barreto et al. | |
| 2013/0332771 A1 | 12/2013 | Salapura et al. | |
| 2014/0052877 A1 | 2/2014 | Mao | |
| 2014/0068612 A1* | 3/2014 | Torrey | 718/1 |
| 2014/0101649 A1 | 4/2014 | Kamble | |
| 2014/0109172 A1 | 4/2014 | Barton et al. | |
| 2015/0244802 A1* | 8/2015 | Simoncelli | H04L 67/1097 |
| | | | 709/219 |
| 2015/0326531 A1 | 11/2015 | Cui et al. | |
| 2016/0203008 A1 | 7/2016 | Cui et al. | |

OTHER PUBLICATIONS

Non-final Office Action dated Jul. 7, 2015 for related U.S. Appl. No. 14/278,363.
Non-final Office Action dated Jul. 16, 2015 for related U.S. Appl. No. 14/584,466.
International Search Report and Written Opinion dated Aug. 20, 2015, for related PCT Patent Application No. PCT/US15/31096, 8 pages.
International Search Report and Written Opinion dated Aug. 26, 2015, for related PCT Patent Application No. PCT/US15/31096, 8 pages.
Final Office Action dated Feb. 25, 2016 for related U.S. Appl. No. 14/584,466.
Final Office Action dated Mar. 23, 2016 for related U.S. Appl. No. 14/278,363.
Lamport, Leslie "Paxos Made Simple," dated Nov. 1, 2001, 14 pages.
Alexander Shraer, et al., "Dynamic Reconfiguration of Primary/Backup Clusters," dated 2011, 13 pages.
Notice of Allowance and Fee(s) due dated Oct. 30, 2015 for related U.S. Appl. No. 14/144,520.
Wikipedia, "Compare-and-swap," Nov. 9, 2015, 6 pages.
International Search Report and Written Opinion dated Aug. 7, 2015, for corresponding PCT Patent Application No. PCT/US2015/030026, 10 pages.
Non-final Office Action dated Sep. 22, 2016 for related U.S. Appl. No. 14/584,466.
Citrix, "Citrix XenServer 6.0 Administrator's Guide", Copyright 2012 Citrix Systems, Inc., 207 pages.
John L Hufferd, Hufferd Enterprises, SNIA, "IP Storage Protocols: iSCSI", Copyright 2011 Storage Networking Industry Association, 46 pages.
VMware, Technical White Paper, "Multipathing Configuration for Software iSCSI Using Port Binding", Copyright 2012 Vmware, Inc., 15 pages.
Non-final Office Action dated Oct. 7, 2016 for related U.S. Appl. No. 14/278,363.
Non-final Office Action dated Nov. 1, 2016 for related U.S. Appl. No. 14/708,091.

* cited by examiner

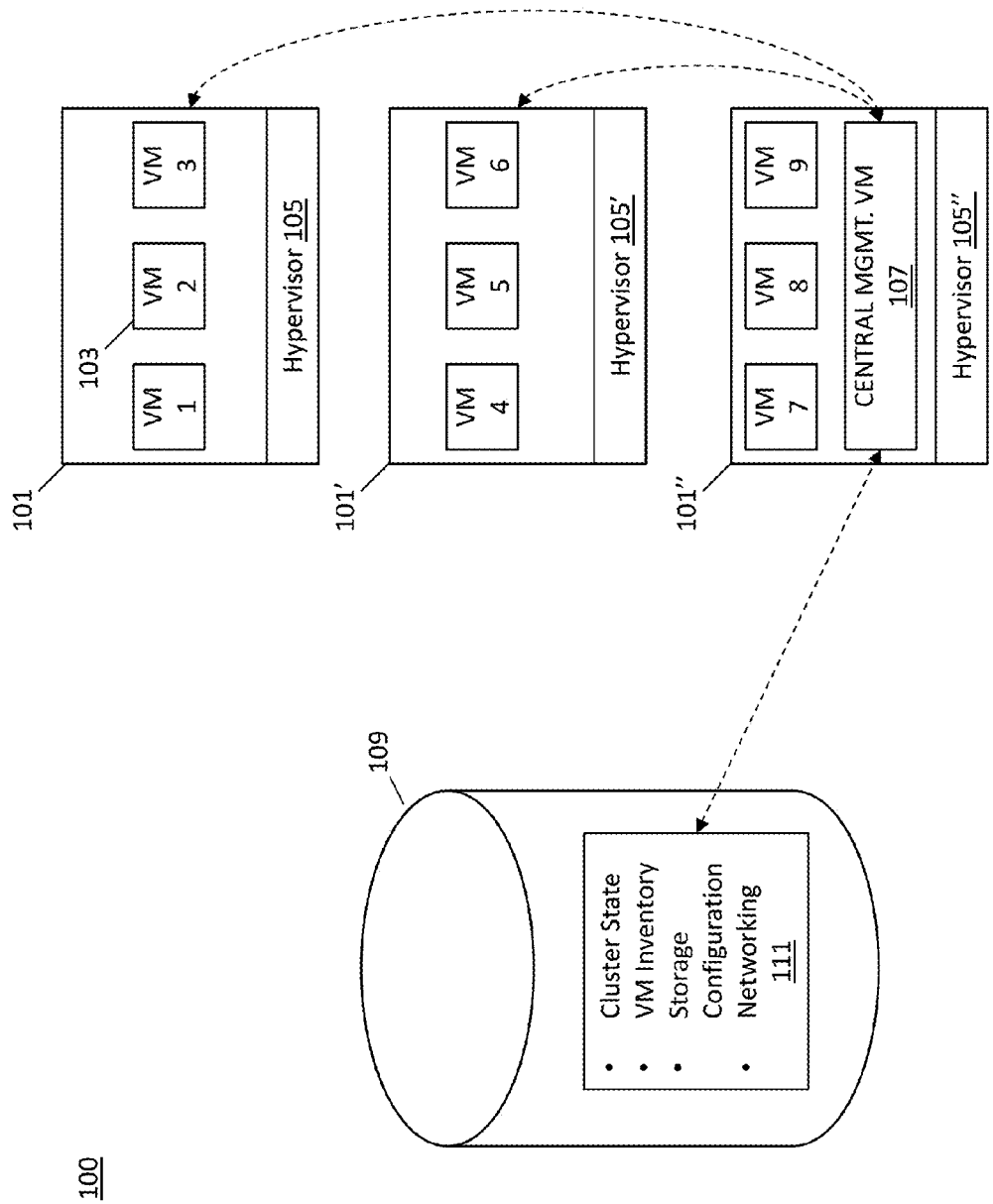

METHOD AND SYSTEM FOR PROVIDING DISTRIBUTED MANAGEMENT IN A NETWORKED VIRTUALIZATION ENVIRONMENT

FIELD

This disclosure concerns a method and system for providing distributed management in a networked virtualization environment.

BACKGROUND

A networked virtualization environment includes several nodes (e.g., servers, data centers, etc.) that are in communication with each other, each node hosting several user virtual machines. The networked virtualization environment may also be referred to as a cluster of nodes. In order to maintain functionality of the networked virtualization environment/cluster of nodes, user virtual machines residing with the networked virtualization environment must be managed. Management of user virtual machines within the cluster includes tasks, such as for example, tracking and updating the state of the cluster, the user virtual machine VM inventory, the storage configuration of the cluster, and the network parameters for the user virtual machines.

Conventionally, management of virtual machines within the cluster is performed by a central management virtual machine or physical machine that resides at a node of the cluster. Each time a request is issued by a user virtual machine or an action performed by a user virtual machine in the cluster that requires access to virtual machine management data, the request must be handled by the central management virtual machine or physical machine. Although a shared/central database may be accessible to user virtual machines within the cluster for certain operations, the portion of the shared/central database corresponding to virtual machine management data is accessible only to the central management virtual machine.

Because all access to virtual machine management data for a cluster of nodes is provided by the central management virtual machine or physical machine, the central management virtual machine or physical machine acts as a central point of failure for all VM management related operations. Thus, whenever the central management virtual machine or physical machine fails or the node at which the central management virtual machine or physical machine resides fails, there is a period of time in which access to virtual machine management data is unavailable. Moreover, whenever the central management virtual machine or physical machine fails, there exists the possibility that some or all of the virtual machine management data may be lost or corrupted, requiring time and manual intervention to repair. During this down time, virtual machine management related operations are not adequately processed and errors and unintended behavior for the networked virtualization environment may arise.

Additionally, the central management virtual machine or physical machine may also act as a central point of bottleneck. As the cluster of nodes grows, and the number of user virtual machines within the cluster grows, the central management virtual machine or physical machine may run out of capacity for handling the task of managing virtual machines.

SUMMARY OF THE INVENTION

Embodiments of the present invention provide a system and method for providing distributed management in a networked virtualization environment. A method for handling failure in a networked virtualization environment having distributed virtual machine management, includes identifying a failed management virtual machine instance of a plurality of management virtual machine instances in the networked virtualization environment, wherein each management virtual machine instance of the plurality of management virtual machine instances services a subset of virtualization components in the networked virtualization environment, and wherein each management virtual machine instance of the plurality of management virtual machine instances has access to a corresponding shard of a distributed database for the networked virtualization environment for storing a subset of management data for the networked virtualization environment; designating one or more active management virtual machine instances of the plurality of management virtual machine instances for replacing virtualization component management functionality of the failed management virtual machine instance, wherein the one or more active management virtual machine instances replace virtualization component management functionality of the failed management virtual machine instance by each accessing its subset of management data in its corresponding shard of the database; and distributing a workload of the failed management virtual machine instance amongst the one or more designated active management virtual machine instances in response to identifying the failed management virtual machine instance Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 2A to 2C illustrate an example of central management virtual machine failure in a networked virtualization environment.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect of or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

A networked virtualization environment includes several nodes (e.g., servers, data centers, etc.) that are in communication with each other, each node hosting several user virtual machines. The networked virtualization environment may also be referred to as a cluster of nodes. In order to maintain functionality of the networked virtualization environment/cluster of nodes, user virtual machines residing with the networked virtualization environment must be managed. Management of user virtual machines within the cluster includes tasks, such as for example, tracking and updating the state of the cluster, the user virtual machine VM inventory, the storage configuration of the cluster, and the network parameters for the user virtual machines.

Figure 1:
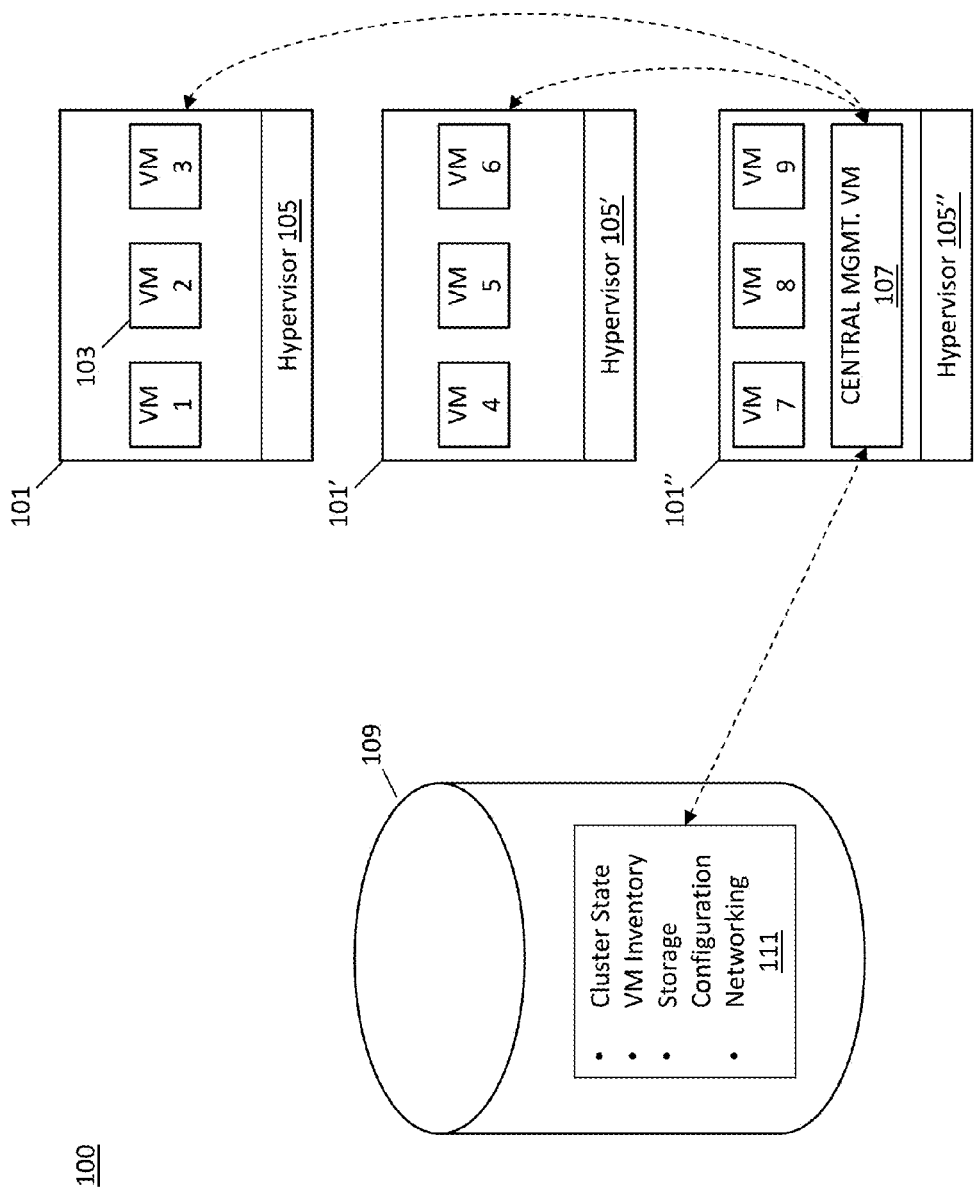
FIG. 1 illustrates a conventional networked virtualization environment having a central management virtual machine.

Conventionally, management of virtual machines within the cluster is performed by a central management virtual machine or physical that resides at a node of the cluster. For purposes of example, the concept of central management of virtual machines within a cluster will be described in the context of a central management virtual machine. However, one ordinarily skilled in the art will recognize that the problems that arise from providing central management of virtual machines within the cluster will also be present where a central management physical machine is utilized to provide management functionality to virtual machines within the cluster. FIG. 1 illustrates a conventional networked virtualization environment 100 (e.g., cluster of nodes) having a central management virtual machine 107. The networked virtualization environment 100 of FIG. 1 includes several nodes 101, 101' and 101", and each node 101, 101' and 101" hosts multiple user virtual machines 103. Node 101 hosts virtual machines VM1, VM2 and VM3, node 101' hosts virtual machines VM4, VM5,and VM6 and node 101" hosts virtual machines VM7, VM8 and VM9. FIG. 1 only depicts only one possible configuration of a networked virtualization environment. One ordinarily skilled in the art will recognize that the networked virtualization environment may be configured to support any number of nodes hosting any number of user virtual machines.

Each node 101, 101', 101" includes a hypervisor 105, 105', 105" that virtualizes physical resources (not shown) to provide a virtualization environment for servicing the plurality of user virtual machines 103 running at that node 101, 101', 101".

The networked virtualization environment 100 may also include a shared database/storage 109. The shared database 109 may be accessible to user virtual machines 103 within the cluster 100 for certain operations, but the portion of the shared database 109 corresponding to virtual machine management data 111 is accessible only to the central management virtual machine 107. For purposes of illustration, only the portion of the shared database 109 corresponding to virtual machine management data 111 is illustrated in FIG. 1.

The dashed arrows between the central management virtual machine 107 and the portion of the shared database 109 corresponding to virtual machine management data 111 illustrate that direct access to virtual machine management data 111 is available only to the central management virtual machine 107 and not to any other virtual machines 103 or nodes 101, 101', 101" within the cluster 100. Likewise, the dashed arrows between the central management virtual machine 107 and other nodes 101', 101 within the cluster 100 where the central management virtual machine 107 does not reside illustrate that access to virtual machine management data 111 by other virtual machines 103 and nodes 101, 101' within the cluster 100 must be provided by the central management virtual machine 107.

Each time a request is issued by a user virtual machine 103 in the cluster 100 that requires access to virtual machine management data 111, the request must be handled by the central management virtual machine 107. Likewise, whenever changes to user virtual machines 103 occur within the cluster 100 that require modification to virtual machine management data 111, the central management virtual machine 107 updates the virtual machine management data 111 accordingly.

Because all access to virtual machine management data 111 for the cluster 100 is provided by the central management virtual machine 107, the central management virtual machine 107 acts as a central point of failure for all VM management related operations. Thus, whenever the central management virtual machine 107 fails or the node 101" at which the central management virtual machine 107 resides fails, there is a period of time in which access to virtual machine management data 111 is unavailable. Moreover, whenever the central management virtual machine 107 fails, there exists the possibility that some or all of the virtual machine management data 111 may be lost or corrupted, requiring time and manual intervention to repair. During this down time, operations related to virtual machine management are not adequately processed and errors and unintended behavior for the networked virtualization environment 100 may arise.

Additionally, the central management virtual machine 107 may also act as a central point of bottleneck. As the cluster of nodes grows 100, and the number of user virtual machines within the cluster 100 grows, the central management virtual machine 107 may run out of capacity for handling the task of managing virtual machines.

Figure 2B:
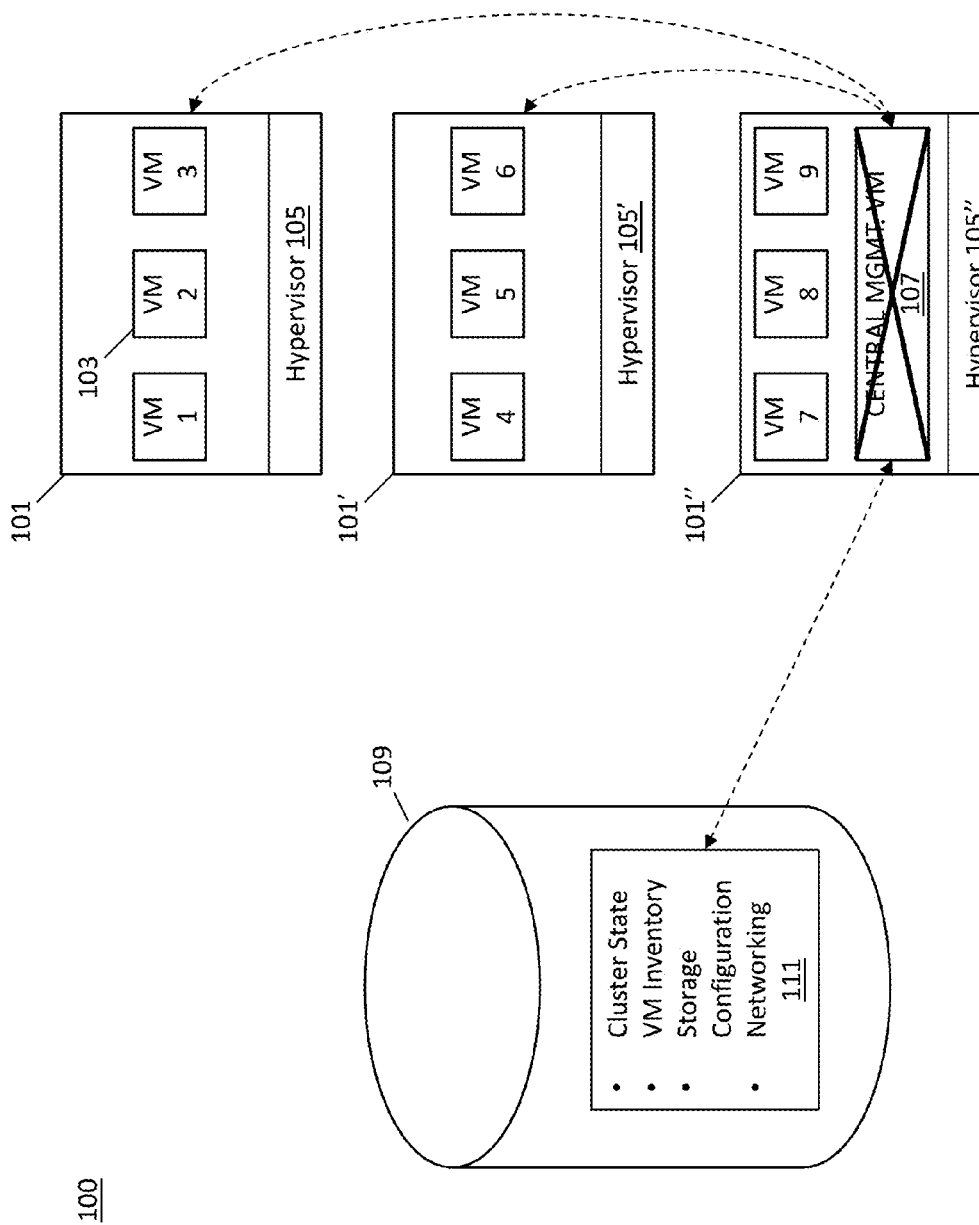
Figure 2C:
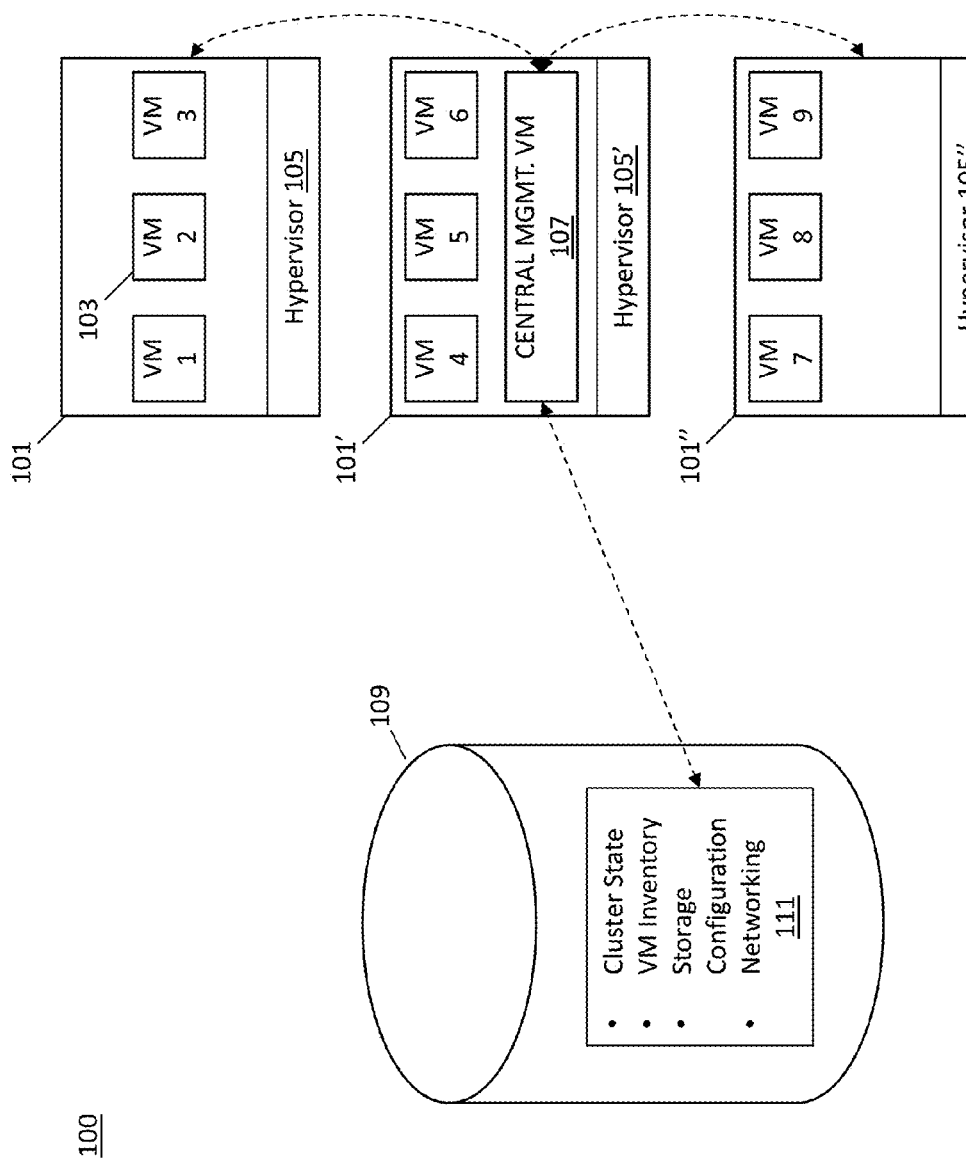

FIG. 2A to 2C illustrate an example of central management virtual machine failure in a networked virtualization environment. The networked virtualization environment 100 illustrated in FIGS. 2A to 2C is substantially similar to the networked virtualization environment 100 of FIG. 1. Initially, a central management virtual machine 107 resides at node 101" of the cluster 100 as illustrated in FIG. 2A. The central management virtual machine 107 services all virtual machine management tasks for the cluster 100. Such tasks may include tracking and updating the state of the cluster 100, the user virtual machine 103 inventory, the storage configuration of the cluster 100, and the network parameters for the user virtual machines 103. Whenever access to virtual machine management data 111 is requested by a user virtual machine 103 in the cluster 100, the central management virtual machine 107 fulfills the request. Likewise, whenever changes to user virtual machines 103 occur within the cluster 101 that require modification of the virtual machine management data 111, the central management virtual machine 107 updates the virtual machine management data 111 accordingly.

Circumstances may arise that lead to failure of the central management virtual machine 107. For example, software bugs or an operating system crash may lead to failure of the central management virtual machine 107. As another example, an operating system update may lead to the central management virtual machine 107 requiring downtime. FIG. 2B illustrates a failure of the central management virtual machine 107 within the networked virtualization environment 100. As illustrated in FIG. 2B, the central management virtual machine 107 itself fails rather than the node 101" at which the central management virtual machine 107 resides. When the central management virtual machine 107 rather than its corresponding node 101" fails, the user virtual machines 103 residing at that node 101" may continue to run and operate on that node 101".

In order for management of virtual machines within the networked virtualization environment 100 to resume after failure of the central management virtual machine 107, the central management virtual machine 107 must be reinstated at one of the nodes 101, 101', 101" in the cluster 100. The cluster 100 may have a built-in mechanism that allows either the node 101" at which the central management virtual machine 107 originally resided or another node 101, 101" within the cluster 100 to boot a new instance of the central management virtual machine 107 after it fails.

FIG. 2C illustrates the networked virtualization environment after the central management virtual machine 107 is reinstated at node 101' in the cluster 100. FIG. 2C depicts the central management virtual machine 107 being reinstated at a different node 101' than the node 101" at which it failed, however the central management virtual machine 107 may be reinstated at various nodes 101, 101', 101" in the networked virtualization environment 100 depending on the failover mechanisms being implemented for the networked virtualization environment 100.

Although management of virtual machines within the networked virtualization environment may resume after failure of the central management virtual machine 107 by reinstating the central management virtual machine 107 at one of the nodes 101, 101', 101" within the cluster 100, during the time that the central management virtual machine 107 is down, virtual machine management data 111 residing within the shared database 109 is inaccessible to user virtual machines 103 in the cluster 101. Additionally, any updates to the virtual machine management data 111 required due to user virtual machine 103 actions may not be properly recorded. Thus, because the central management virtual machine 107 acts as a central point of failure, errors and unintended behavior for the networked virtualization environment 101 may arise whenever the central management virtual machine 107 fails.

Additional errors and unintended behavior for the networked virtualization environment may arise where the node at which the central management virtual machine fails rather than just the central management virtual machine itself. FIGS. 3A-D illustrate another example of central management virtual machine failure in a networked virtualization environment. The networked virtualization environment 100 illustrated in FIGS. 3A to 3D is substantially similar to the networked virtualization environment 100 of FIG. 1. In FIGS. 3A-D, the node 101" at which central management virtual machine 107 resides fails rather than just the central management virtual machine 107 itself.

Figure 3A:
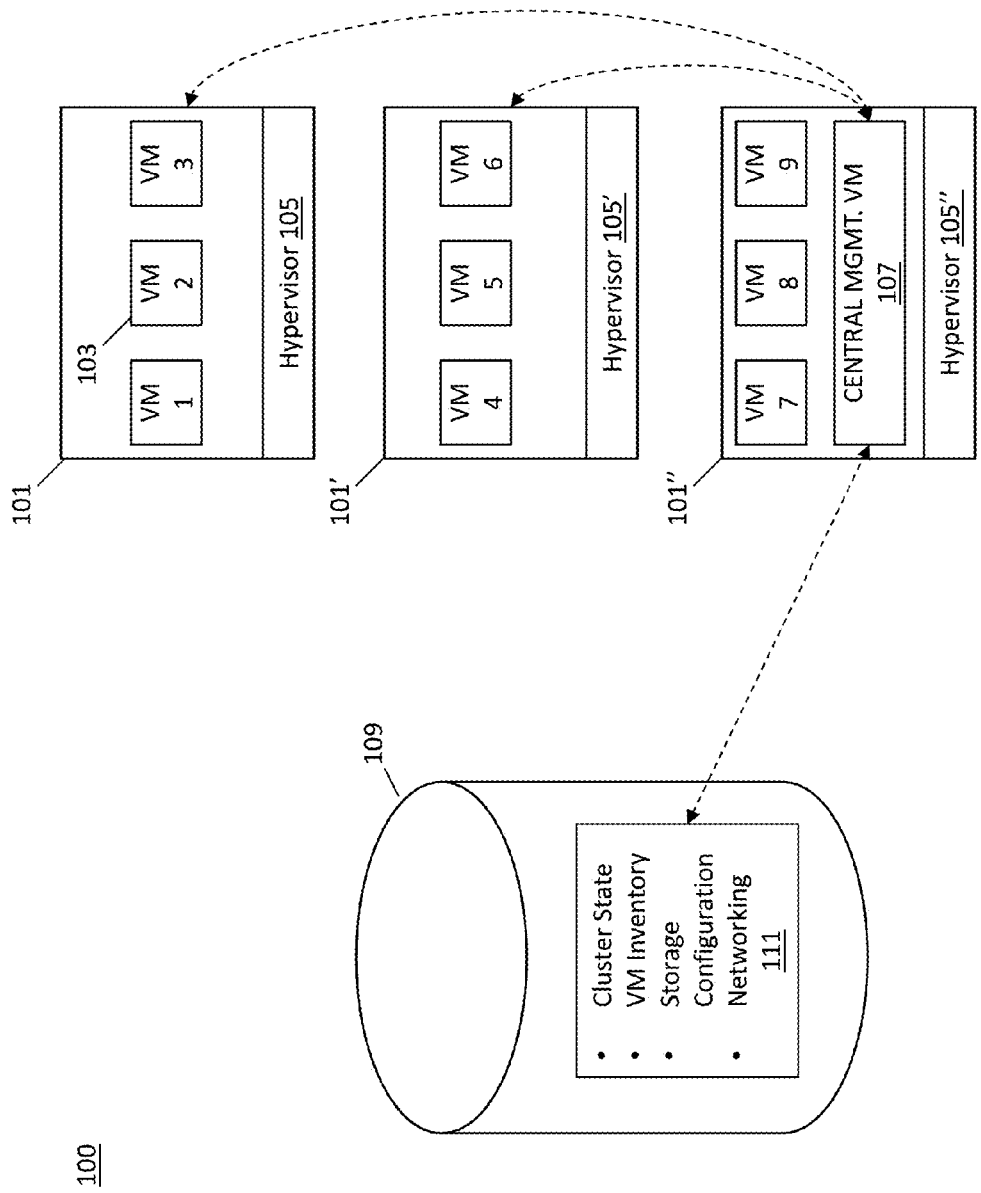
FIGS. 3A-D illustrate another example of central management virtual machine failure in a networked virtualization environment.

Initially, a central management virtual machine 107 resides at node 101" of the cluster 100 as illustrated in FIG. 3A. As discussed above, the central management virtual machine 107 services all virtual machine management tasks for the cluster 100. Whenever access to virtual machine management data 111 is requested by a user virtual machine 103 in the cluster 100, the central management virtual machine 107 fulfills the request. Likewise, whenever changes to user virtual machines 103 occur within the cluster 100 that require modification to virtual machine management data 111, the central management virtual machine 107 updates the virtual machine management data 111 accordingly.

Figure 3B:
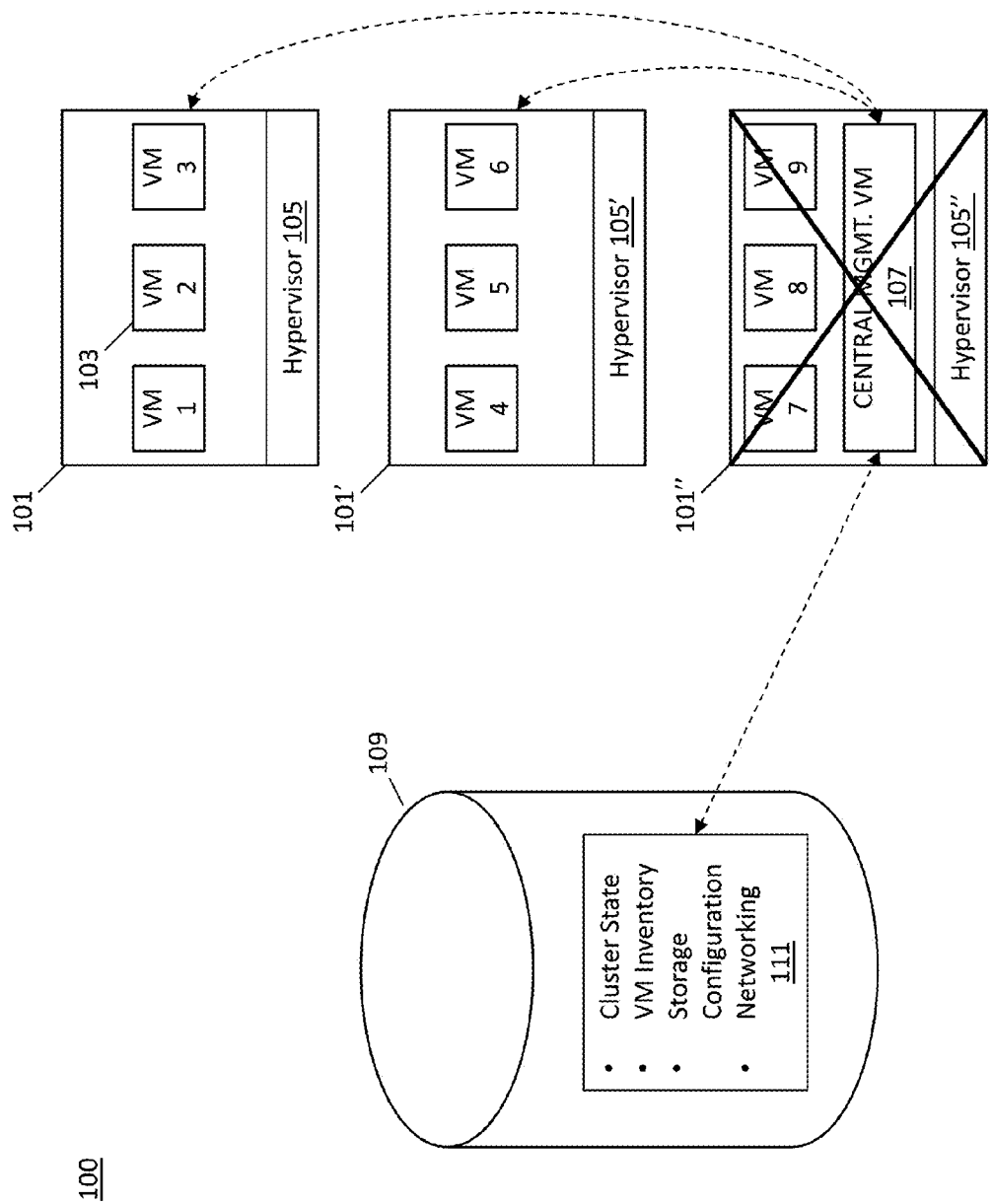

Circumstances may arise that lead to the failure of the node at which the central management virtual machine resides. For example, a power outage, network disconnection, network equipment failure or hardware failure may lead to the failure of the node at which the central management virtual machine resides. FIG. 3B illustrates a failure of the node 101" at which the central management virtual machine 107 resides. As illustrated in FIG. 3B, the node 101" at which the central management virtual machine 107 resides fails rather than just the central management virtual machine 107 itself. When this occurs, all user virtual machines 103 residing at that node 101" also fail. Thus, in addition to recovering the central management virtual machine 107, the user virtual machines 103 (VM7, VM8 and VM9) residing at the node 101" that failed must also be recovered. In some situations, the user virtual machines 103 (VM7, VM8 and VM9) residing at the failed node 101" are reinstated at other nodes 101, 101' within the cluster 100. In other situations, the user virtual machines 103 (VM7, VM8 and VM9) residing at the failed node 100" are reinstated at their original node 101" after the original node 101" recovers from failure.

In order for management of user virtual machines 103 within the networked virtualization environment 100 to resume after failure of the node 101" at which the central management virtual machine 107 resides, the central management virtual machine 107 must be reinstated at one of the nodes 101, 101', 101" in the cluster 100. The cluster may have a built-in mechanism that allows another node 101, 101' within the cluster 100 to boot a new instance of the central management virtual machine 107 after it fails or the cluster 100 may simply recover the node 101" that failed and boot an instance of the central management virtual machine 107 at that node 101" after recovery.

Figure 3C:
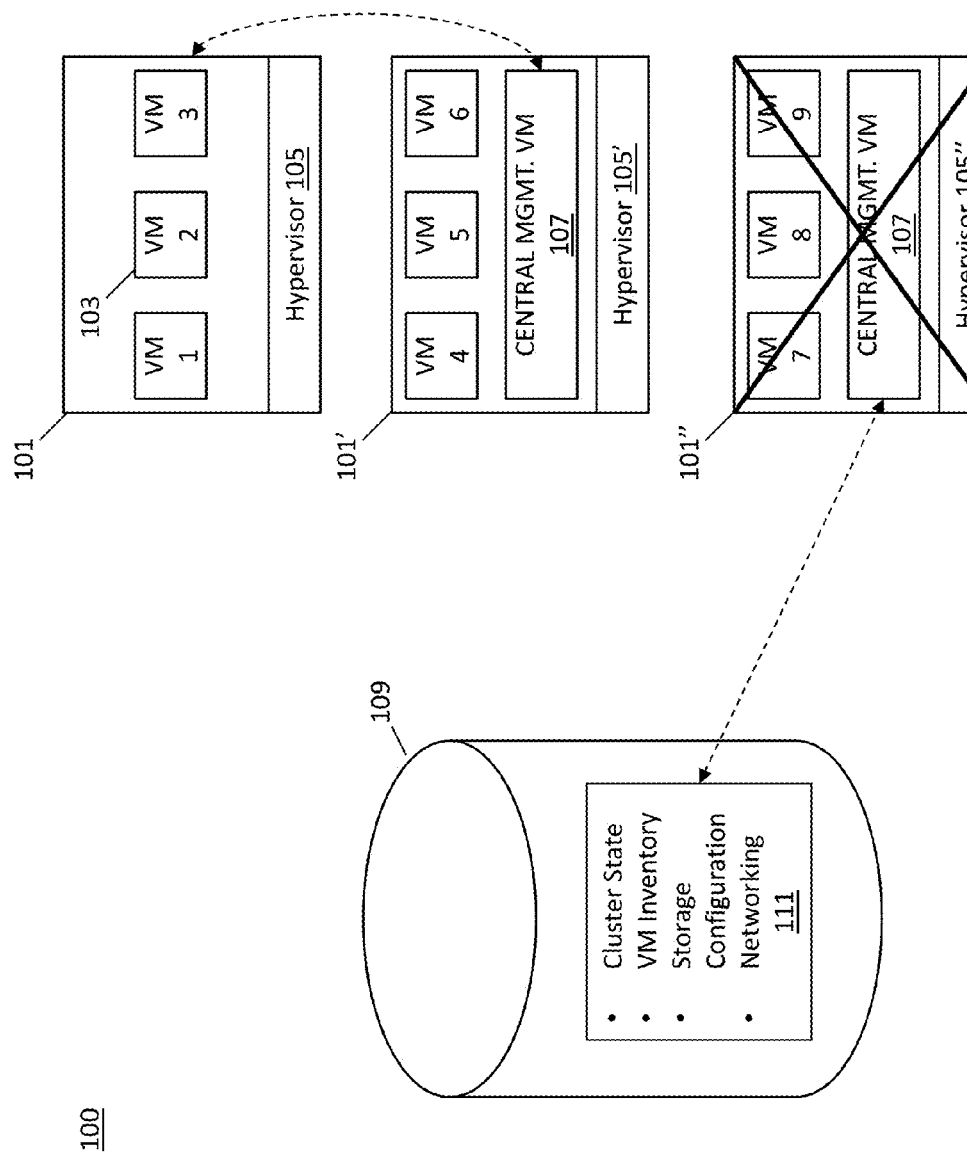

FIG. 3C illustrates the networked virtualization environment 100 after an instance of the central management virtual machine 107 is established at node 101' in the cluster 100 after failure. FIG. 3C depicts the central management virtual machine 107 instance being established at a different node 101' than the node 101" which failed, however the central management virtual machine 107 instance may be established at various nodes 101, 101', 101" in the networked virtualization environment 100 depending on the failover mechanisms being implemented for the networked virtualization environment 100.

As mentioned above, although management of user virtual machines 103 within the networked virtualization environment 100 may resume after failure of the central management virtual machine 107 by reestablishing the central management virtual machine 107, during the time that the central management virtual machine 107 is down, virtual machine management data 111 residing within the shared database 109 is inaccessible to user virtual machines 103 in the cluster 101. Additionally, any updates to the virtual machine management data 111 required due to user virtual machine actions may not be properly recorded. Thus, because the central management virtual machine 107 acts as a central point of failure, errors and unintended behavior for the networked virtualization environment 100 may arise whenever the central management virtual machine fails.

Figure 3D:
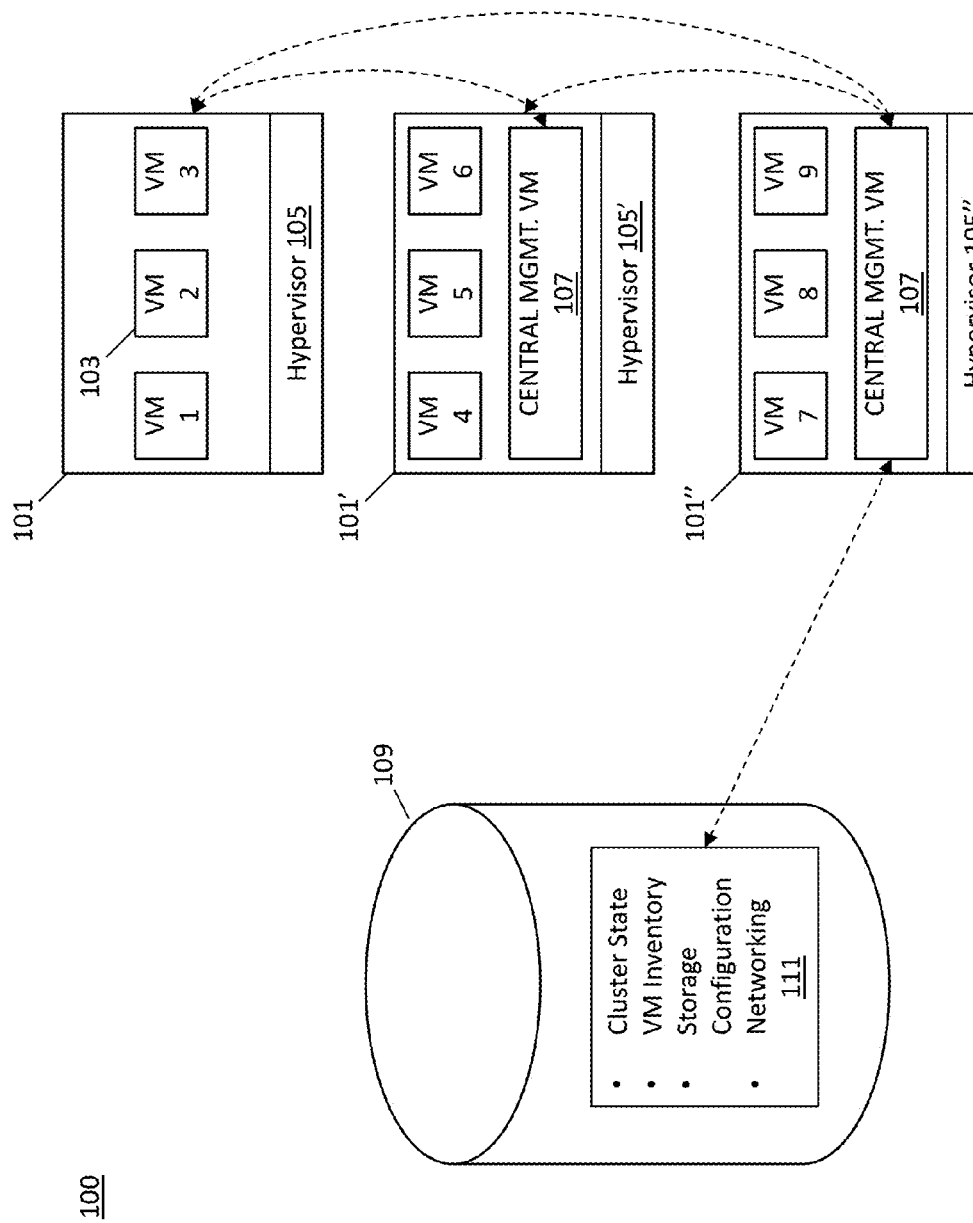

In addition to the issues described above, when the node 101" that failed is reinstated it may not immediately realize that another instance of the central management virtual machine 107 has been established at another node 101' in the networked virtualization environment 100. The reinstated node 101" may itself establish another instance of the central management virtual machine 107, such that two instances of the central management virtual machine 107 are simultaneously running in the networked virtualization environment 100. This is illustrated in FIG. 3D.

When multiple instances of the central management virtual machine 107 are established in the networked virtualization environment 101 after failure, user virtual machines 103 within the networked virtualization environment 100 may have problems locating the correct central management virtual machine instance 107 for accessing virtual machine management data. Likewise changes to user virtual machines 103 within the networked virtualization environment 100 may be managed by multiple central management virtual machine instances 107 leading to inconsistent updates to the virtual machine management data 111.

Because the conventional networked virtualization environment utilizes a central management virtual machine that operates as a central point of failure for virtual machine management, an improved approach for providing virtual machine management in a networked virtualization environment that overcomes the limitations of conventional approaches is needed.

Figure 4:
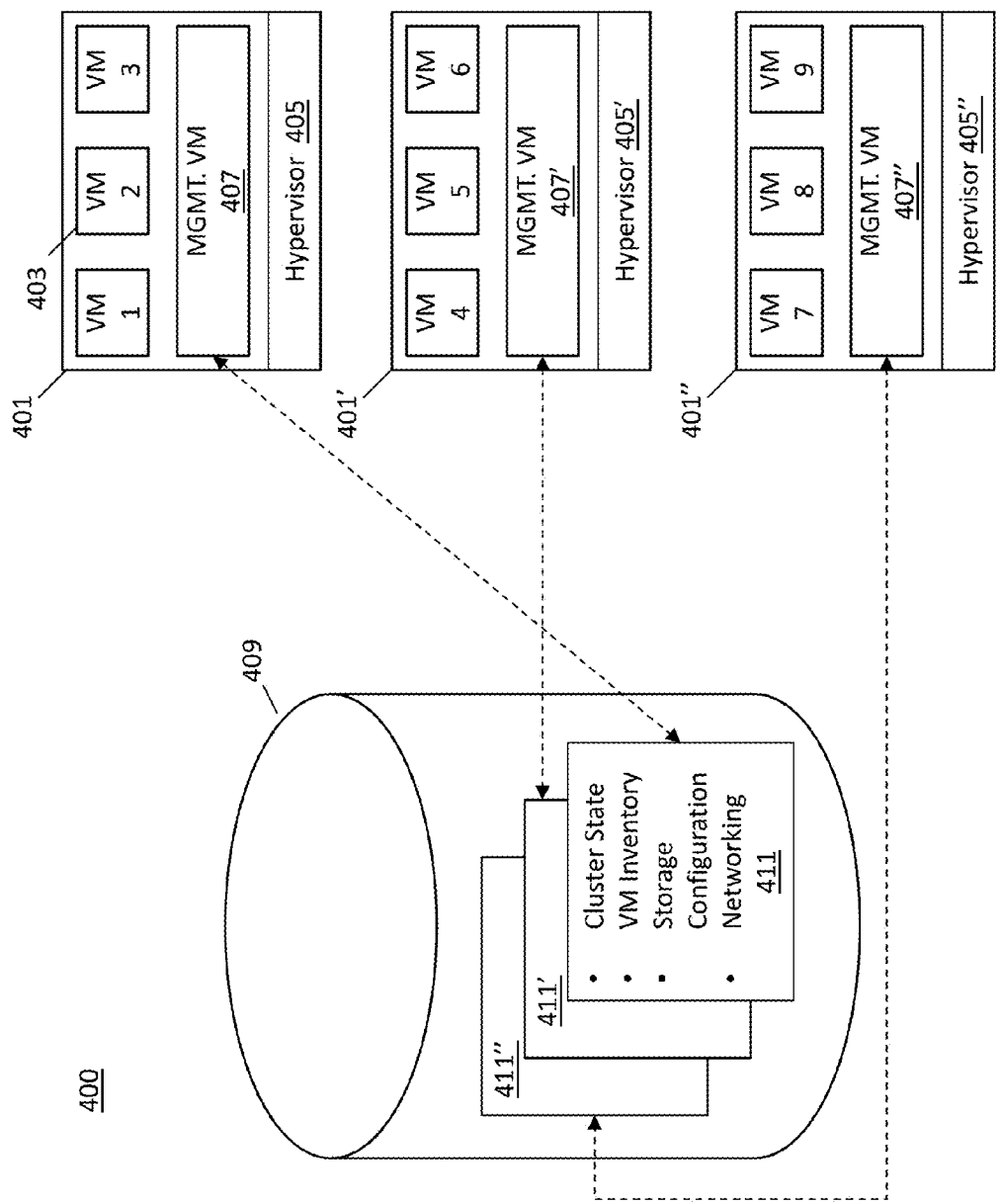
FIG. 4 illustrates a networked virtualization environment having distributed virtual machine management according to some embodiments.

FIG. 4 illustrates a networked virtualization environment 400 having distributed virtual machine management according to some embodiments. The networked virtualization environment 400 of FIG. 4 includes several nodes 401, 401', 401" that are in communication with each other. Each node 401, 401', 401" includes a hypervisor 405, 405', 405" that virtualizes physical resources (not shown) to provide a virtualization environment for servicing a plurality of user virtual machines 403. Physical resources such as CPUs, I/O devices, storage may be shared amongst all nodes 401 in the networked virtualization environment 400.

Node 401 provides a virtualization environment for servicing user virtual machines VM1, VM2 and VM3. Node 401' provides a virtualization environment for servicing user virtual machines VM4, VM5 and VM6. Node 401" provides a virtualization environment for servicing user virtual machines VM7, VM8 and VM9.

Each node 401, 401', 401" also includes an instance of a management virtual machine 407, 407', 407". The management virtual machine instances 407, 407', 407" each have access to a distributed database 409 that includes virtual machine management data. The distributed database 409 is partitioned into multiple portions 411, 411', 411" which will be referred to herein as shards. Each management virtual machine instance 407, 407', 407" is provided access to its corresponding shard 411, 411', 411" in the distributed database 409. It is important to note that the corresponding shard 411, 411', 411" for each management virtual machine instance 407, 407', 407" may or may not be located in a storage device local to the node 401, 401', 401" at which the management virtual machine instances 407, 407', 407" reside. For example, a shard for a management virtual machine instance 411, 411', 411" may be located in a local storage device of its corresponding node 401, 401', 401", located in a local storage device of a node 401, 401', 401" other than its corresponding node, or a networked storage device.

As illustrated in FIG. 4, management virtual machine instance 407 is provided access to shard 411 of the distributed database 409, management virtual machine instance 407' is provided access to shard 411' of the distributed database 409, and management virtual machine instance 407" is provided access to shard 411" of the distributed database 409. Each shard 411, 411', 411" includes a copy of the virtual machine management data necessary for providing management functionality to the user virtual machines 403 within the cluster 400. By utilizing a distributed database 409, where virtual machine management data is replicated at different shards 411, 411', 411" that correspond to different management virtual machine instances 407, 407', 407", virtual machine management functionality may remain unimpeded even where a management virtual machine instance 407, 407', 407" or its corresponding shard 411, 411', 411" becomes unavailable.

Whenever a management virtual machine instance 407, 407', 407" in the cluster 400 becomes unavailable, another management virtual machine instance 407, 407', 407" in the cluster 400 may take over because the other management virtual machine instance 407, 407', 407" has access to the necessary virtual machine management data in its corresponding shard for providing virtual machine management functionality to the cluster 400. Similarly, whenever a shard 411, 411', 411" becomes unavailable, the necessary virtual machine management data for providing virtual machine management functionality to the cluster will be available at another shard 411, 411', 411" in the distributed database 409.

The virtual machine management data 411 residing at each shard 411, 411', 411" may include such information for the networked virtualization environment 400 as state information for the cluster 400, an inventory of user virtual machines 403 available for the networked virtualization environment 400, storage configurations for user virtual machines 403, and networking configurations and parameters for user virtual machines 403.

Each management virtual machine instance 407, 407', 407" may be configured to provide management functionality for user virtual machines 403 that reside in its corresponding node 401. Alternatively, management virtual machine instances 407, 407', 407" may be configured to provide management functionality for user virtual machines 403 that reside in other nodes 401 within the networked virtualization environment 400. Together, the management virtual machine instances 407, 407', 407" at each node 401, 401', 401" along with their corresponding shards 411, 411', 411" form a distributed management system for providing virtual machine management to the networked virtualization environment 400.

FIG. 4 depicts one example configuration for a networked virtualization environment 400 having a distributed management system for providing virtual machine management. One ordinarily skilled in the art will recognize that the networked virtualization environment having a distributed management system for providing virtual machine management may be extended to include any number of nodes servicing any number of user virtual machines.

User virtual machines 403 may request for a management function to be performed by their corresponding management virtual machine instance 407, 407', 407". Likewise, user virtual machine actions are tracked by corresponding management virtual machine instances 407, 407', 407", which subsequently update the virtual machine management data residing in the shards 411, 411', 411" of the distributed database 409 in response to the user virtual machine action.

Because a management virtual machine instance 407, 407', 407" runs on every node 401, 401', 401" within the networked virtualization environment 400 and all management virtual machine instances 407, 407', 407" have access to the virtual machine management data in their corresponding shard 411, 411', 411" of the distributed database 409, any active management virtual machine instance 407, 407', 407" may take over the virtual machine management functionality of another virtual machine instance 407, 407', 407" whenever it fails, which will be described in greater detail below. This prevents the absence of virtual machine management functionality during periods of management virtual machine failure, thereby eliminating the errors and unintended behavior for the networked virtualization environment associated with use of a central management virtual machine.

Figure 5:
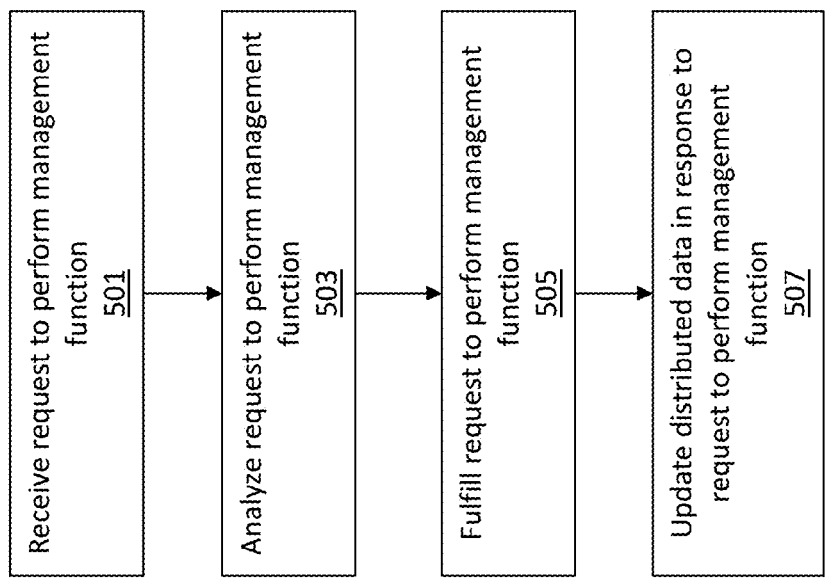
FIG. 5 is a flow diagram illustrating a method for providing distributed virtual machine management in a networked virtualization environment according to some embodiments.

FIG. 5 is a flow diagram illustrating a method for providing distributed virtual machine management in a networked virtualization environment according to some embodiments.

In contrast to the conventional approach for virtual machine management in which all requests to perform management functions are handled by a single central management virtual machine, the method for providing distributed virtual machine management of FIG. 5 allows management virtual machine instances at each node in the virtualization environment to be assigned a set of user virtual machines and perform management functions for its assigned set of user virtual machines. The assignment of user virtual machines to management virtual machine instances may be performed dynamically such that any management virtual machine instance may provide management functions for any set of user virtual machines in the networked virtualization environment. This allows for virtual machine management functionality within the networked virtualization environment to be load balanced by distributing the workload amongst multiple management virtual machine instances.

FIG. 5 illustrates the steps performed by a management virtual machine instance for fulfilling a management function request by one of its corresponding user virtual machines. Initially, a management virtual machine instance may receive a request to perform a management function by a corresponding user virtual machine as shown at 501. The management function request may be directly issued by the user virtual machine or may alternatively be a management function request identified by the management virtual machine instance in response to user virtual machine action.

In some embodiments, such a request by the user virtual machine may be a request for virtual machine management data. For example, the user virtual machine may request a copy of the current state of the cluster. Such state information may include the number of nodes running within the cluster, the number of user virtual machines running within the cluster, and the physical resources allocated by each node.

In other embodiments, a request to update virtual machine management data may be identified by the management virtual machine instance in response to user virtual machine action. For example, a user virtual machine may update its current storage configuration to provide for additional storage or to reduce the amount of available storage and the management virtual machine may identify that such action requires modification of virtual machine management data.

The management virtual machine instance then analyzes the request to perform a management function as shown at 503. In analyzing the request, the management virtual machine may identify whether the request is a request for virtual machine management data or a request to update virtual machine management data.

After the request for performing a management function is analyzed, the request for performing a management function is fulfilled by the management virtual machine instance corresponding to the requesting user virtual machine as shown at 505. Where the request is a request for information, fulfilling the request may simply involve reading information pertaining to virtual machine management from its corresponding shard of the distributed database and providing that information to the requesting user virtual machine. Where the request is instead a request for updating information pertaining to virtual machine management, fulfilling the request may involve writing additional information or modifying information stored in its corresponding shard of the distributed database as well as the other shards of the distributed database corresponding to the other management virtual machine instances in the networked virtualization environment.

Once the request for performing a management function is fulfilled, the distributed database is updated (when appropriate) in accordance with the management function performed as shown at 507.

Each management virtual machine instance in the networked virtualization environment described above provides the same ability to service management function requests as a central management virtual machine. However, each management virtual machine instance may only be assigned a subset of all the user virtual machines in the networked virtualization environment. Also, each management virtual machine instance has full access to its corresponding shard in the distributed database, which includes all the necessary virtual machine management data for providing virtual machine management functionality to the networked virtualization environment.

By utilizing such a distributed virtual machine management implementation rather than a centralized virtual machine management implementation, load balancing may be achieved and issues associated with failure of a central management virtual machine may be avoided. Load balancing may be achieved through efficient distribution of user virtual machines to management virtual machine instances. Additionally, issues associated with failure of management virtual machine instances may be avoided by allowing all management virtual machines full access to virtual machine management data through their corresponding shard of the distributed database, so that any active management virtual machine instance in the networked virtualization environment may take over the management functionality for a failing management virtual machine instance.

One key advantage in utilizing a distributed virtual machine management implementation rather than a centralized virtual machine management implementation for a networked virtualization environment is the ability to avoid a central point of failure. In this way, virtual machine management functionality may be provided for all user virtual machines in the networked virtualization environment even where one or more management virtual machine instances are failing.

Another key advantage in utilizing a distributed virtual machine management implementation rather than a centralized virtual machine management implementation for a networked virtualization environment is the ability to avoid a central point of bottleneck. Rather than having a single central management virtual machine provide virtual machine management functionality for the entire networked virtualization environment, virtual machine management functionality is distributed amongst multiple instances of management virtual machines to avoid the problem of the central management virtual machine running out of capacity.

Figure 6:
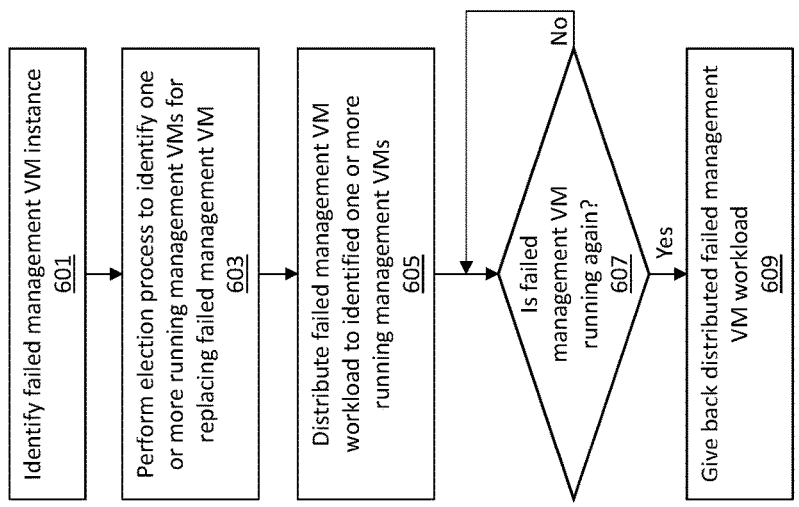
FIG. 6 is a flow diagram illustrating a method for handling failure in a networked virtualization environment having distributed virtual machine management according to some embodiments.

FIG. 6 is a flow diagram illustrating a method for handling failure in a networked virtualization environment having distributed virtual machine management according to some embodiments. Initially, a failed management virtual machine instance is identified as shown at 601. The virtual machine management data stored at each shard of the distributed database may include the state of the networked virtualization environment, and any active management virtual machine instances in the cluster may identify active and failing management virtual machines from its corresponding shard in the distributed database. Alternatively, management virtual machine instances within the networked virtualization environment may periodically ping each other to determine the health of other management virtual machine instances.

The failing management virtual machine instance may have itself failed or instead may reside on a failing node within the networked virtualization environment. The method for handling the failure of a management virtual machine instance is applicable regardless of whether the failing management virtual machine itself fails or resides on a failing node.

Once a failing management virtual machine instance is identified, the remaining management virtual machine instances in the networked virtualization environment may undergo a leadership election process to identify one or more active management virtual machine instances to replace the failing management virtual machine instance as shown at 603. The leadership election process may be a two-step process, whereby a leader management virtual machine instance is first elected followed by distribution of the management functionality of the failing management virtual machine instance to other management virtual machine instances in the networked virtualization environment by the elected leader management virtual machine instance.

Various leadership election processes may be used to elect the leader management virtual machine instance. For example, the first management virtual machine instance to identify the failing management virtual machine instance may become the leader. Alternatively, the networked virtualization environment may have a set order that is used to determine a leader upon failure of a management virtual machine instance.

Once the leader management virtual machine instance is elected, the leader management virtual machine instance may designate one or more active management virtual machine instances within the networked virtualization environment to replace the management functionality of the failing management virtual machine instance. Replacing the management functionality of the failing management virtual machine instance may involve providing access to virtual machine management data for user virtual machines previously assigned to the failing management virtual machine instance as well as tracking actions of user virtual machines previously assigned to the failing management virtual machine instance that require modification to the virtual machine management data.

In some embodiments, the leader management virtual machine may designate itself to replace the management functionality of the failing management virtual machine instance. In other embodiments, the leader management virtual machine may designate itself and one or more other active management virtual machine instances to replace the failing management virtual machine instance. In other embodiments, the leader management virtual machine may designate one or more other active management virtual machine instances to replace the failing management virtual machine instance.

The designation of active management virtual machine instances for replacing the management functionality of the failing management virtual machine instance may be accomplished based on a current workload of the active management virtual machine instances. For example, the leader management virtual machine instance may designate one or more active management virtual machine instances having a low current workload for replacing the failing management virtual machine. Additionally, the designation of active management virtual machine instances for replacing the management functionality of the failing management virtual machine instance may be accomplished based on the workload of the failing management virtual machine prior to failure. For example, the leader management virtual machine instance may determine that a greater number of active management virtual machine instances may be needed for a failing management virtual machine instance that had a greater workload prior to failure.

Workload may refer to the number of user virtual machines a management virtual machine instance is servicing or the number of virtual machine management data requests being handled by a management virtual machine instance.

Once the active management virtual machine instances have been designated for replacing the failing management virtual machine instance, the workload of the failing management virtual machine is distributed to the designated active management virtual machine instances as shown at 605.

Where the failing management virtual machine instance is itself failing, the user virtual machines previously being serviced by the failing management virtual machine may remain at their current node and be reassigned to the designated active management virtual machine instances. Alternatively, the user virtual machines being previously being serviced by the failing management virtual machine may be migrated to the nodes at which their assigned management virtual machine instances are located.

Where the failing management virtual machine resides on a node that is failing, the user virtual machines previously being serviced by the failing management virtual machine may be restarted on the nodes at which their assigned management virtual machine instances are located.

After the workload of the failing management virtual machine is distributed to the designated active management virtual machine instances, the active management virtual machines in the networked virtualization environment may determine whether the failing management virtual machine instance is recovered as shown at 607. In some embodiments, the leader management virtual machine may continue to monitor the distributed database to determine whether or not the failing management virtual machine has been recovered. In other embodiments, any management virtual machine instance in the networked virtualization environment may monitor the distributed database to determine whether or not the failing management virtual machine has been recovered.

If it is determined that the failing management virtual machine has not been recovered, then the method returns to 607, where it continues to periodically check whether the failing management virtual machine instance is running again.

If instead it is determined that the failing management virtual machine has been recovered, then the user virtual machines being serviced by the failing management virtual machine prior to failure may optionally be reassigned to the recovered management virtual machine as shown at 609. In some embodiments, the user virtual machines being serviced by the failing management virtual machine prior to failure may continue to be serviced by their newly assigned management virtual machine instances until the cluster otherwise decides to redistribute user virtual machines based on workload.

Where the failing management virtual machine instance was itself failing, the user virtual machines currently being serviced by newly assigned management virtual machine instances may remain at their node and simply be reassigned to the recovered management virtual machine instance. Where the failing management virtual machine instance belonged to a failing node, the user virtual machines currently being serviced by newly assigned management virtual machine instances may be migrated back to their original node and assigned to the recovered management virtual machine at the original node.

By establishing a management virtual machine instance on every node within the networked virtualization environment and providing all management virtual machine instances full access to the virtual machine management data in their corresponding shard of the distributed database, a management virtual machine instance may take over the virtual machine management functionality of another management virtual machine instance whenever it fails. This prevents the absence of virtual machine management functionality during periods of management virtual machine failure thereby eliminating the errors and unintended behavior for the networked virtualization environment associated with use of a central management virtual machine.

Additionally, by utilizing a distributed virtual machine management implementation rather than a centralized virtual machine management implementation, load balancing may be achieved through efficient distribution of user virtual machines to management virtual machine instances.

FIGS. 7A to F illustrate a method for handling failure of a management virtual machine in a networked virtualization environment having distributed virtual machine management according to some embodiments. The networked virtualization environment depicted in FIGS. 7A to F is substantially similar to the networked virtualization environment depicted in FIG. 4.

Figure 7A:
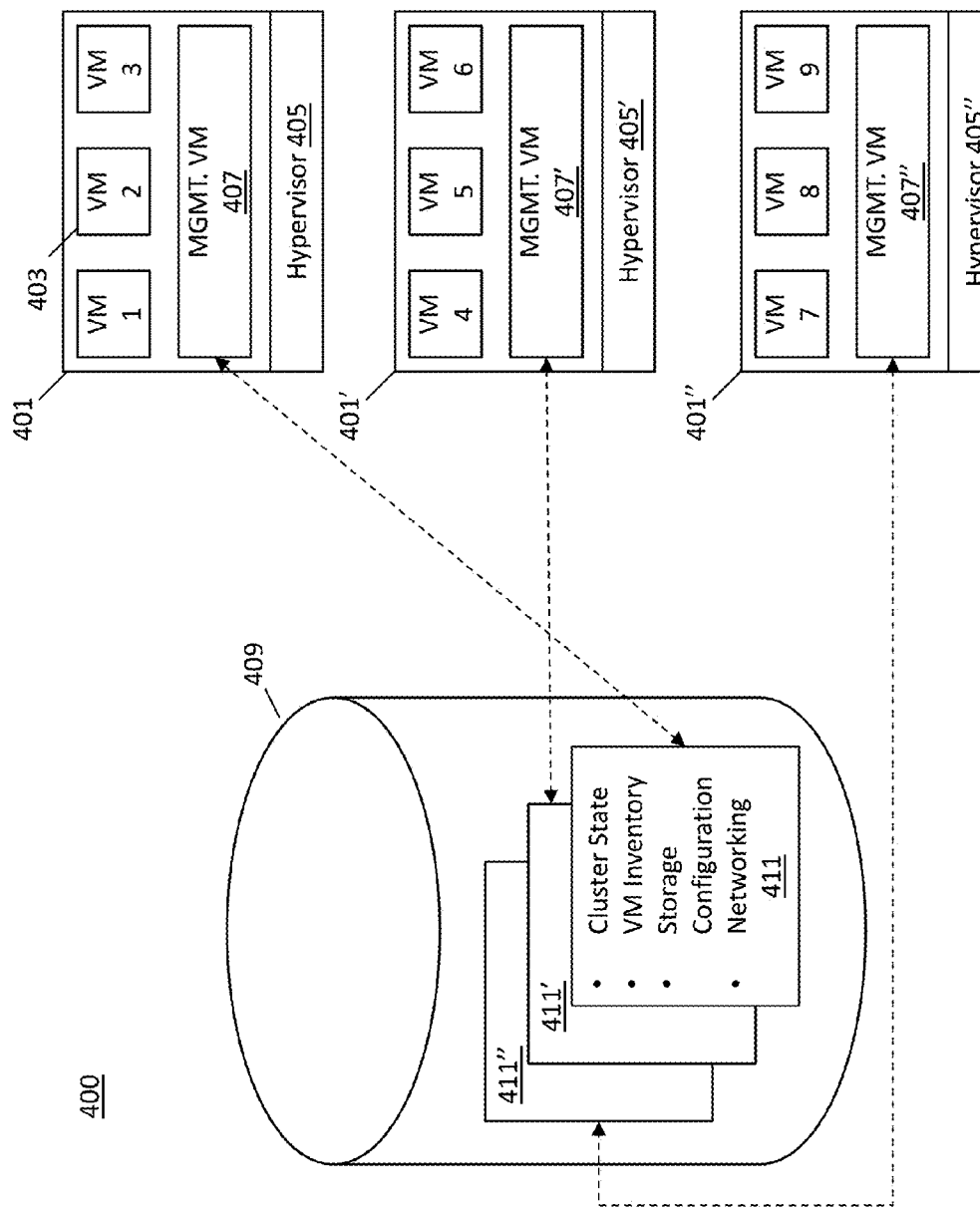
FIGS. 7A to F illustrate a method for handling failure of a management virtual machine in a networked virtualization environment having distributed virtual machine management according to some embodiments.

As illustrated in FIG. 7A, each node 401, 401', 401" in the networked virtualization environment 400 includes a management virtual machine instance 407, 407', 407". Each management virtual machine instance 407, 407', 407" provides virtual machine management functionality to the user virtual machines 403 residing at its corresponding node 401. Such virtual machine management functionality includes fulfilling management functions requested by corresponding user virtual machines 403 and updating virtual machine management data for actions performed by corresponding user virtual machines 403.

The management virtual machine instances 407, 407', 407" each have access to a distributed database 409 that includes virtual machine management data. The distributed database 409 is partitioned into multiple shards 411, 411', 411" and each management virtual machine instance 407, 407', 407" is provided access to its corresponding shard 411, 411', 411" in the distributed database 409. Each shard 411, 411', 411" includes a copy of the virtual machine management data necessary for providing management functionality to the user virtual machines 403 within the cluster 400.

Figure 7B:
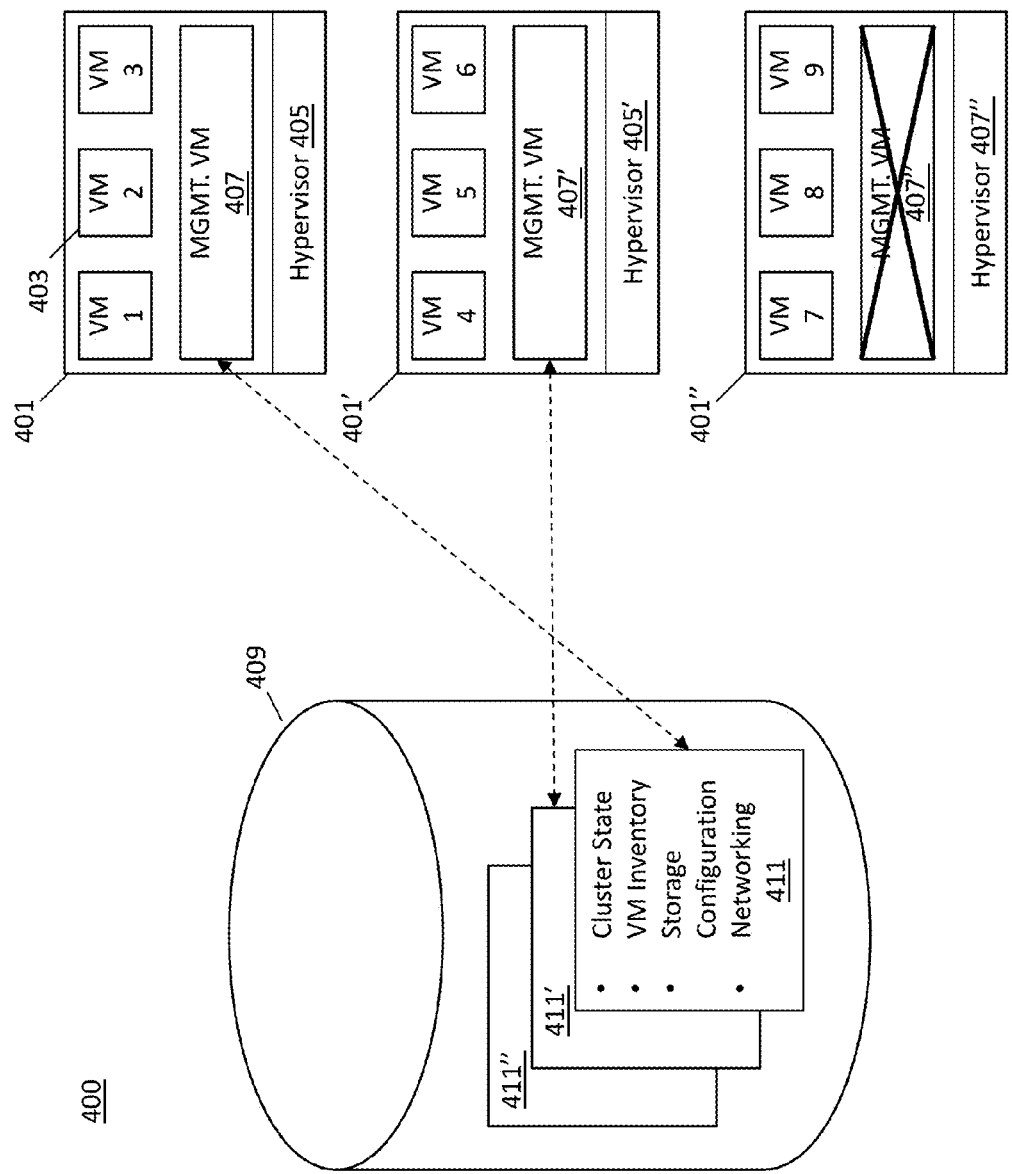

In FIG. 7B, a management virtual machine instance 407" fails. The failing management virtual machine instance 407" is first identified. As mentioned above, the virtual machine management data residing at each shard 411, 411', 411" of the distributed database 409 may include the state of the networked virtualization environment 400, and any active management virtual machine instances 407, 407' in the cluster 400 may identify active and failing management virtual machines from its corresponding shard 411, 411' of the shared database 409. Alternatively, management virtual machine instances 407, 407', 407" within the networked virtualization environment 400 may periodically ping each other to determine the health of other management virtual machine instances 407, 407', 407".

Once a failing management virtual machine instance 407" is identified, the remaining management virtual machine instances 407, 407" in the networked virtualization environment undergo a leadership election process to identify one or more active management virtual machine instances 407, 407' to replace the failing management virtual machine instance 407". The leadership election process is a two-step process, whereby a leader management virtual machine instance is first elected followed by distribution of the management functionality of the failing management virtual machine instance to other management virtual machine instances in the networked virtualization environment by the elected leader management virtual machine instance.

Figure 7C:
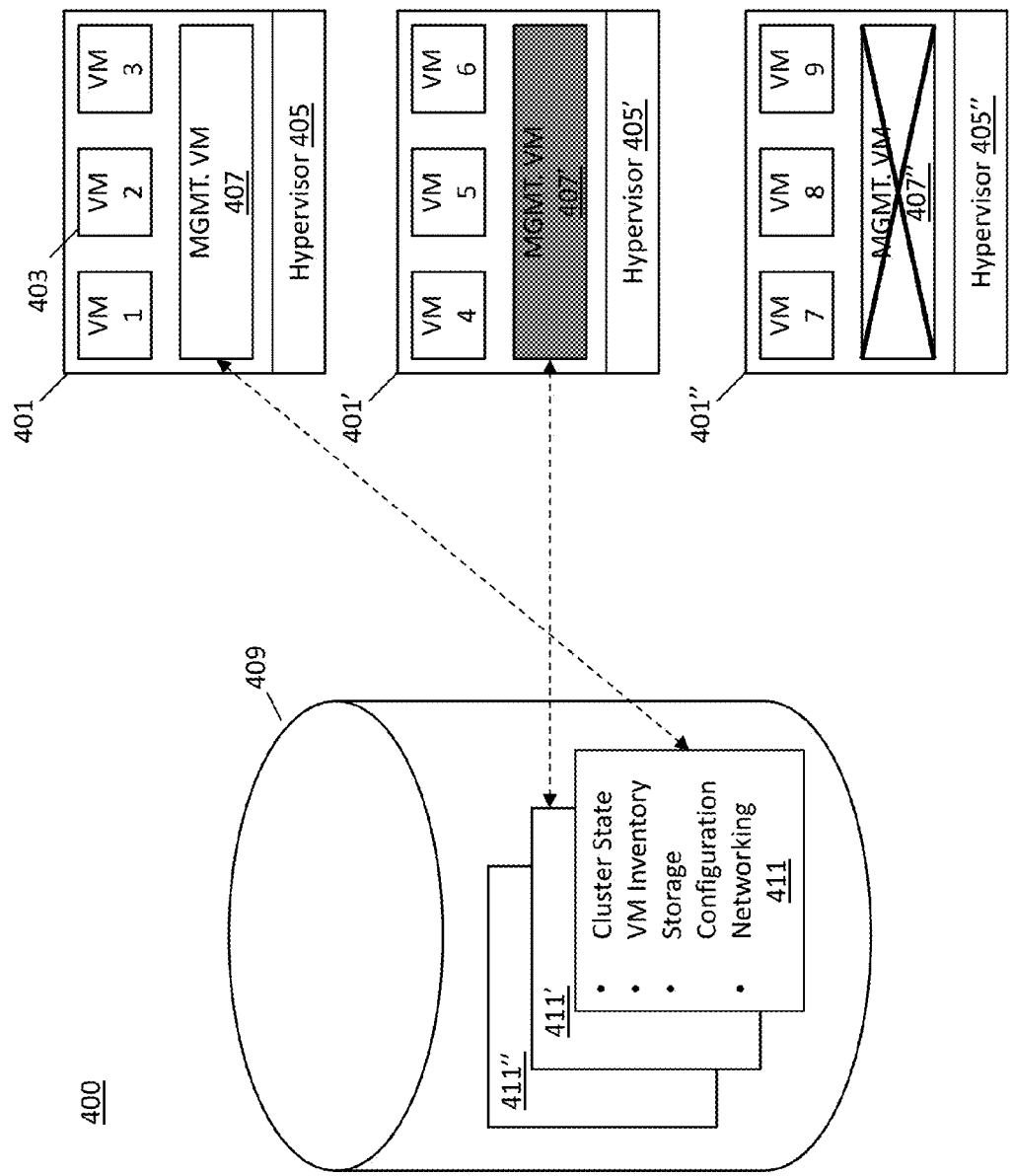

In FIG. 7C, the management virtual machine instance 407' residing at node 401' is elected as the leader management virtual machine instance as depicted by the shading of management virtual machine instance 407'. The management virtual machine instance 407' residing at node 401' may be elected the leader management virtual machine instance because it was the first management virtual machine instance to identify the failing management virtual machine instance 407". Alternatively, the management virtual machine instance 407' residing at node 401' may be elected the leader management virtual machine instance in accordance with a set order implemented by the cluster 400.

Figure 7D:
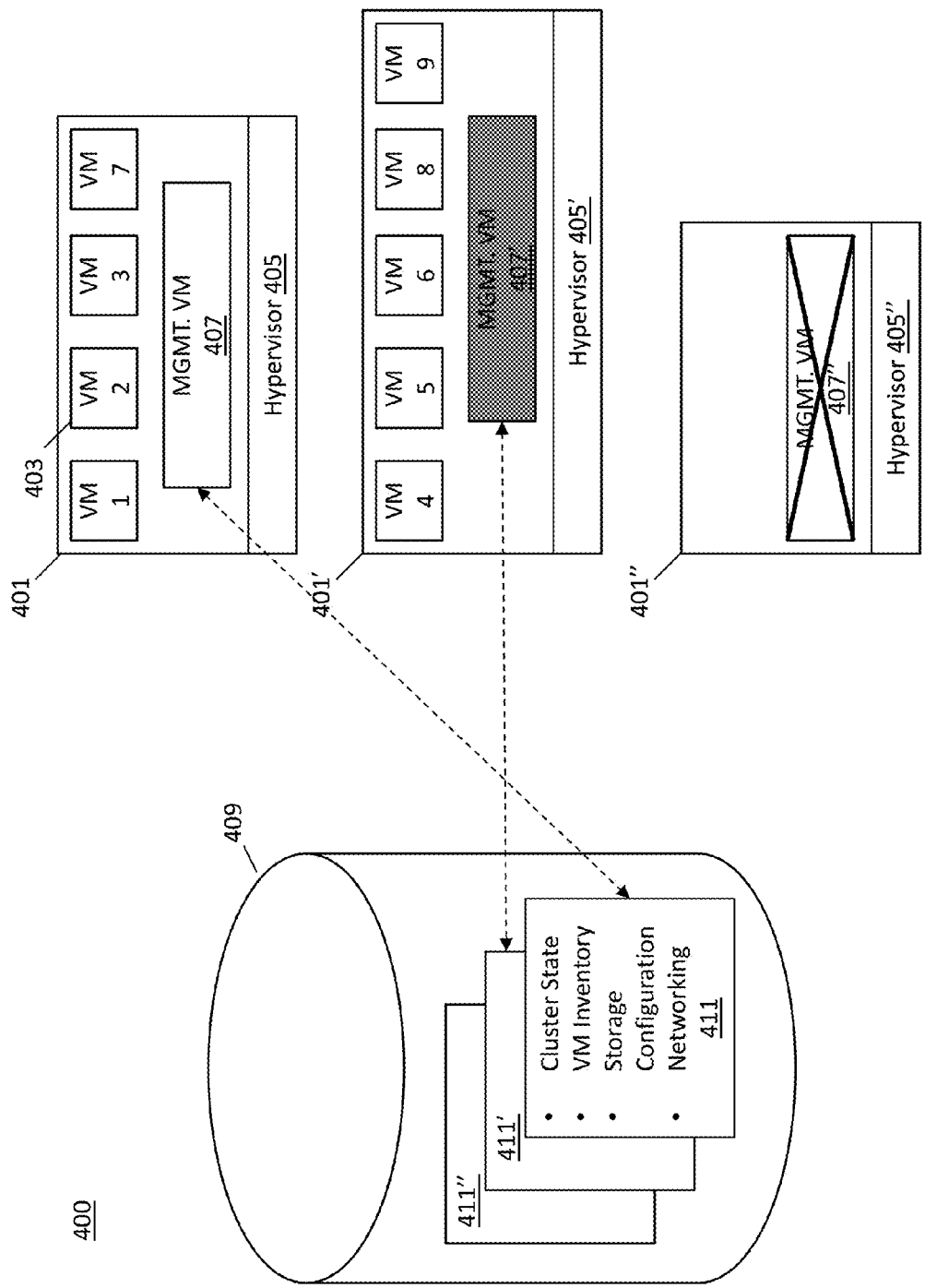

Once the leader management virtual machine instance 407' is elected, the leader management virtual machine instance 407' may designate one or more active management virtual machine instances 407, 407' within the networked virtualization environment to replace the management functionality of the failing management virtual machine instance 407". FIG. 7D illustrates the designation of active management virtual machine instances 407, 407' for replacing the management functionality of the failing management virtual machine instance 407". In FIG. 7D, the user virtual machines VM7, VM8 and VM9 that were originally being serviced by the failing management virtual machine 407" are re-distributed such that the leader management virtual machine instance 407' at node 401' now provides management functionality to user virtual machines VM8 and VM9 while the management virtual machine instance 407 at node 401 provides management functionality to user virtual machine VM7.

As illustrated in FIG. 7D, the user virtual machines VM7, VM8 and VM9 being previously being serviced by the failing management virtual machine 407" are migrated to the nodes 401, 401' at which their assigned management virtual machine instances 407, 407' are located. However, it is important to note that the user virtual machines VM7, VM8, and VM9 previously being serviced by the failing management virtual machine instance 407" may be reassigned to designated active management virtual machine instances 407, 407' while remaining at their current node 401".

After the workload of the failing management virtual machine instance 407" is distributed to the designated active management virtual machine instances 407, 407', the active management virtual machines 407, 407' in the networked virtualization environment may determine whether the failing management virtual machine instance 407" is recovered. If it is determined that the failing management virtual machine 407" has not been recovered, then the active management virtual machine instances 407, 407' may continue to periodically check whether the failing management virtual machine instance 407" is running again.

Figure 7E:
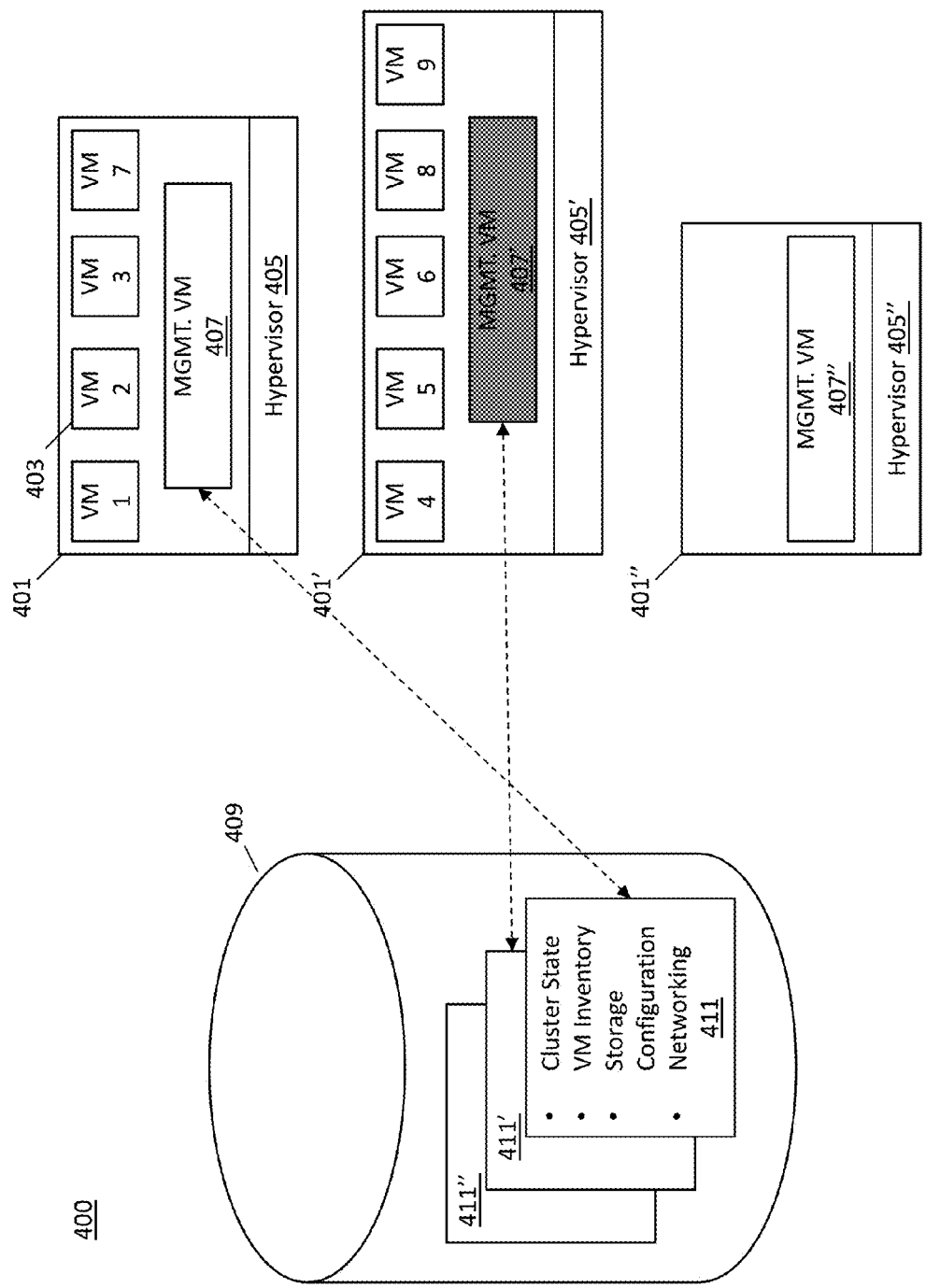

FIG. 7E depicts the networked virtualization environment 400 after the failing management virtual machine instance 407" has recovered. As depicted in FIG. 7E, when the previously failing management virtual machine instance 407" is first recovered on its original node 401", it is no longer providing virtual machine management functionality to user virtual machines VM7, VM8 and VM9 because virtual machine management functionality for those user virtual machines was replaced by the other active management virtual machine instances 407, 407' in the cluster 400.

Figure 7F:
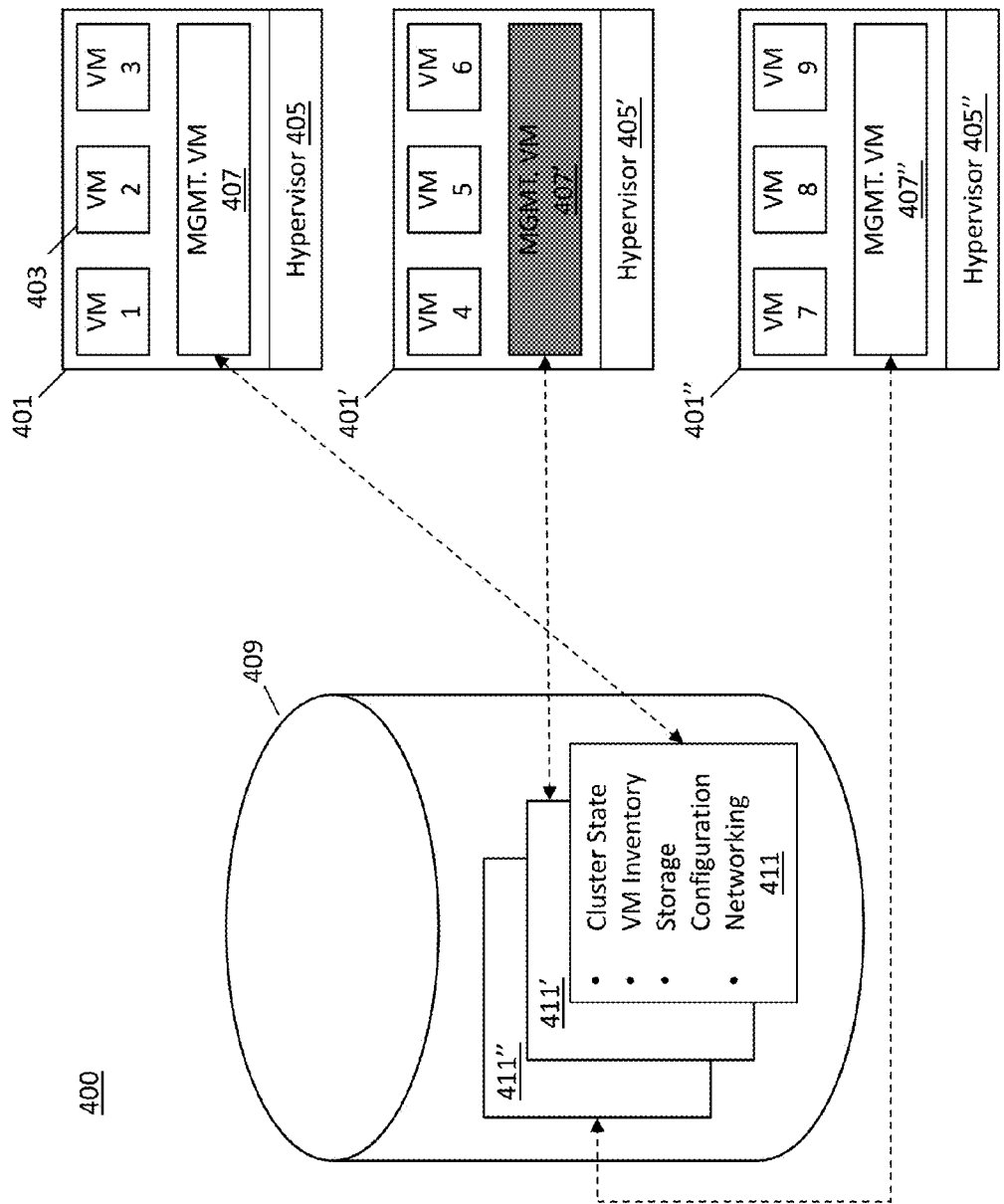

After the failing management virtual machine 407" has recovered, the user virtual machines VM7, VM8 and VM9 may be optionally reassigned to the recovered management virtual machine instance 407" as illustrated in FIG. 7F. Alternatively, the user virtual machines VM7, VM8, and VM9 previously being serviced by the failing management virtual machine instance 407" may continue to be serviced by their newly assigned management virtual machine instances 407, 407' until the cluster 400 otherwise decides to redistribute user virtual machines 403 based on workload.

Reassignment of the user virtual machines VM7, VM8 and VM9 may be accomplished by migrating the user virtual machines VM7, VM8 and VM9 back to the node 401" where the recovered management virtual machine instance 407" is located as depicted in FIG. 7F. This occurs when replacement of management functionality for the failing management virtual machine instance 407" involved migration of those user virtual machines VM7, VM8 and VM9.

Alternatively, where replacement of management functionality for the failing management virtual machine 407" involved simply leaving user virtual machines VM7, VM8 and VM9 on their original node 401", reassignment of the user virtual machines VM7, VM8 and VM9 to the recovered management virtual machine instance 407" may be accomplished without migration.

FIGS. 8A to F illustrate a method for handling failure of a node in a networked virtualization environment having distributed virtual machine management according to some embodiments. The networked virtualization environment depicted in FIGS. 8A to F is substantially similar to the networked virtualization environment depicted in FIG. 4.

Figure 8A:
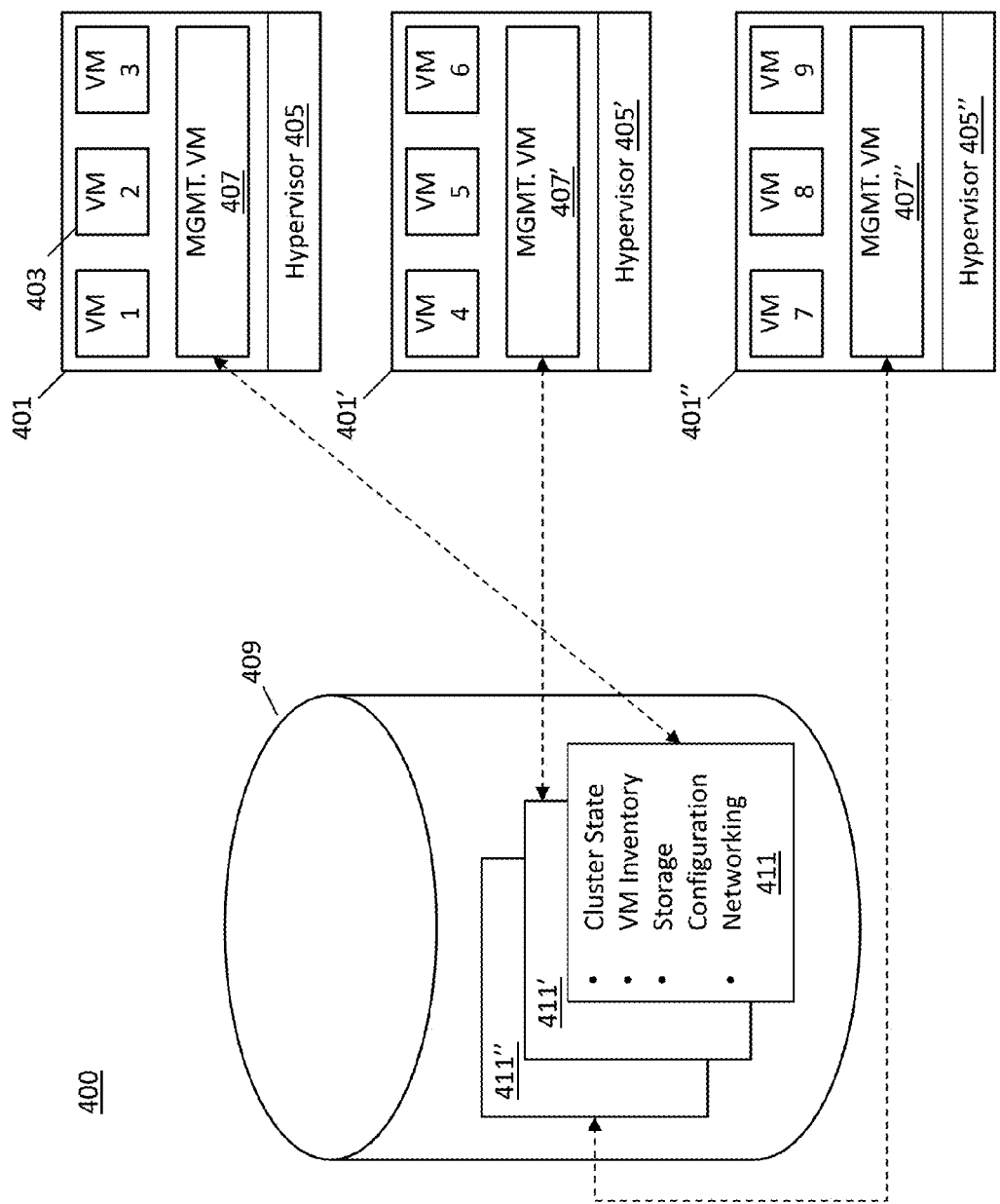
FIGS. 8A to F illustrate a method for handling failure of a node in a networked virtualization environment having distributed virtual machine management according to some embodiments.

As illustrated in FIG. 8A, each node 401, 401', 401" in the networked virtualization environment 400 includes a management virtual machine instance 407, 407', 407". Each management virtual machine instance 407, 407', 407" provides virtual machine management functionality to the user virtual machines 403 in its corresponding node 401, 401', 401". Such virtual machine management functionality includes fulfilling management functions requested by corresponding user virtual machines 403 and updating virtual machine management data 411 for actions performed by corresponding user virtual machines 403.

The management virtual machine instances 407, 407', 407" each have access to a distributed database 409 that includes virtual machine management data. The distributed database 409 is partitioned into multiple shards 411, 411', 411" and each management virtual machine instance 407, 407', 407" is provided access to its corresponding shard 411, 411', 411" in the distributed database 409. Each shard 411, 411', 411" includes a copy of the virtual machine management data necessary for providing management functionality to the user virtual machines 403 within the cluster 400.

Figure 8B:
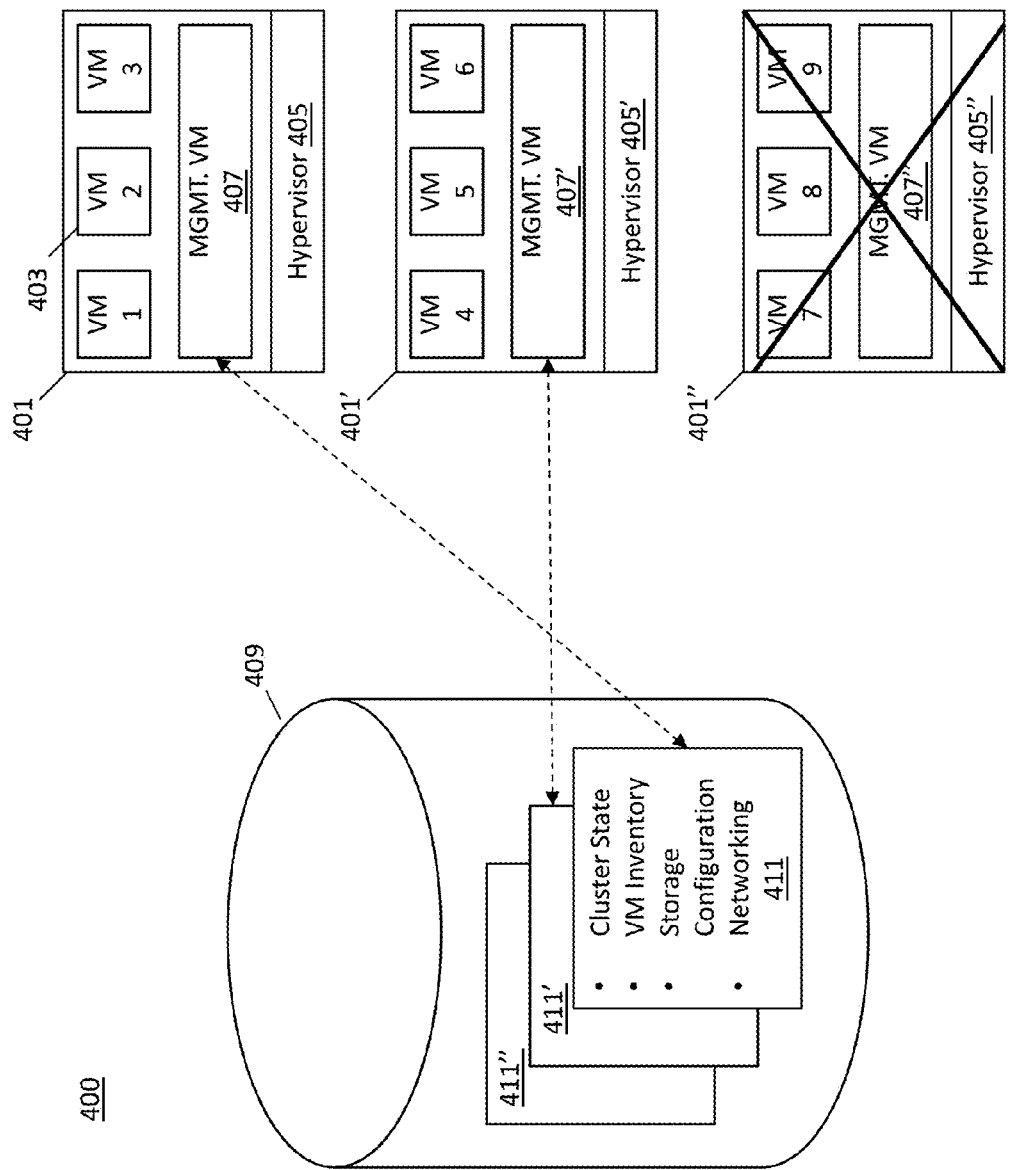

In FIG. 8B, node 401" and its corresponding management virtual machine instance 407" and user virtual machines VM7, VM8 and VM9 fail. The failing management virtual machine 407" is first identified. As mentioned above, the virtual machine management data stored in each shard 411, 411', 411" of the distributed database 409 may include the state of the networked virtualization environment 400, and any active management virtual machine instances 407, 407' in the cluster 400 may identify active and failing management virtual machines from its corresponding shard 411, 411' of the shared database 409. Alternatively, management virtual machine instances 407, 407', 407" within the networked virtualization environment 400 may periodically ping each other to determine the health of other management virtual machine instances 407, 407', 407".

Once a failing management virtual machine instance 407" is identified, the remaining management virtual machine instances 407, 407' in the networked virtualization environment 400 undergo a leadership election process to identify one or more active management virtual machine instances 407, 407' to replace the failing management virtual machine instance.

Figure 8C:
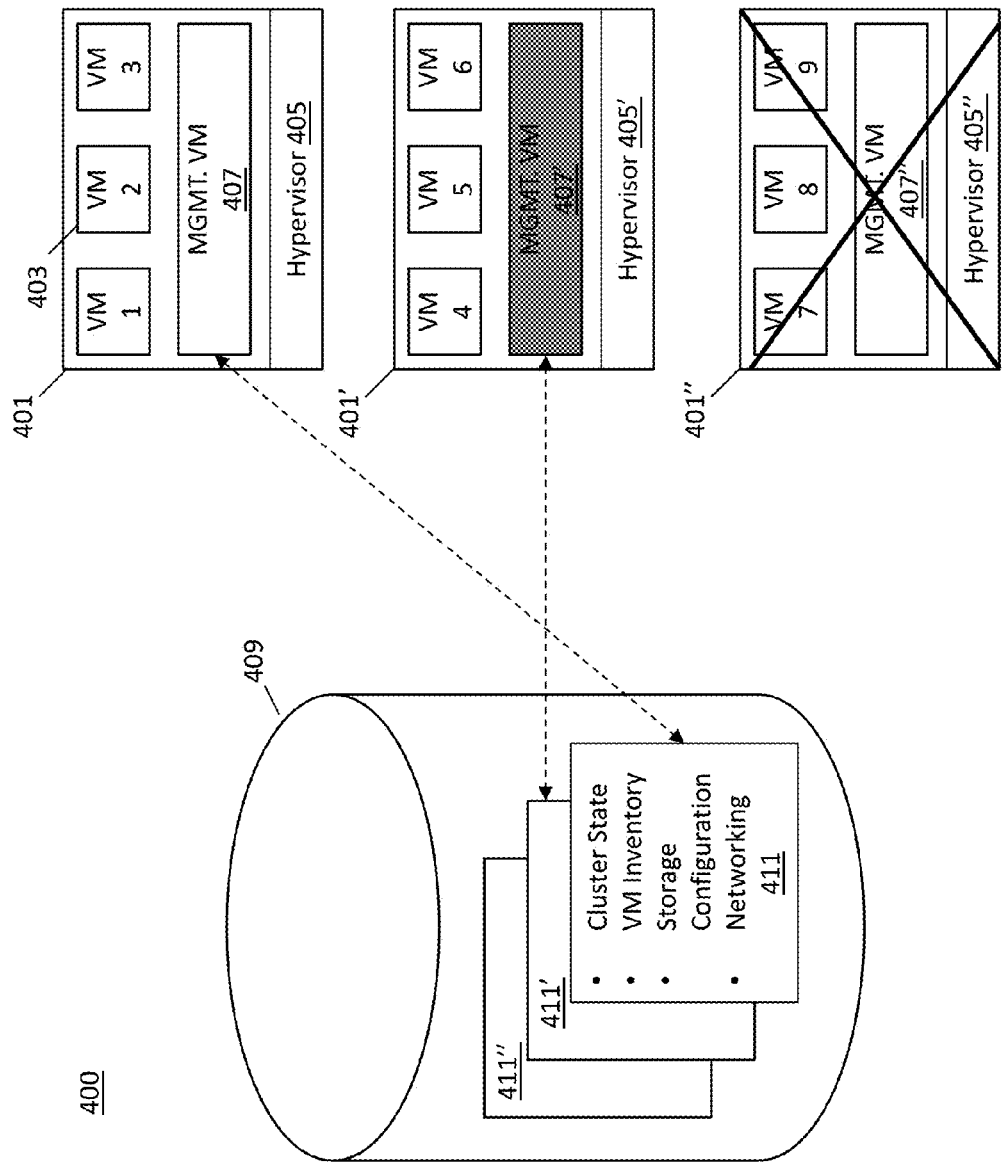

In FIG. 8C, the management virtual machine instance 407' residing at node 401' is elected as the leader management virtual machine instance as depicted by the grey shading. The management virtual machine instance 407' residing at node 401' may be elected the leader management virtual machine instance because it was the first management virtual machine instance to identify the failing management virtual machine instance 407". Alternatively, the management virtual machine instance 407' residing at node 401' may be elected the leader management virtual machine instance in accordance with a set order implemented by the cluster 400.

Once the leader management virtual machine instance 407' is elected, the leader management virtual machine instance 407' may designate one or more active management virtual machine instances 407, 407' within the networked virtualization environment 400 to replace the management functionality of the failing management virtual machine instance 407". Because the node 401" failed, the user virtual machines VM7, VM8 and VM9 residing on the node 401" prior to failure must first be reinstated at nodes 401, 401' having their designated active management virtual machine instance 407, 407'.

Figure 8D:
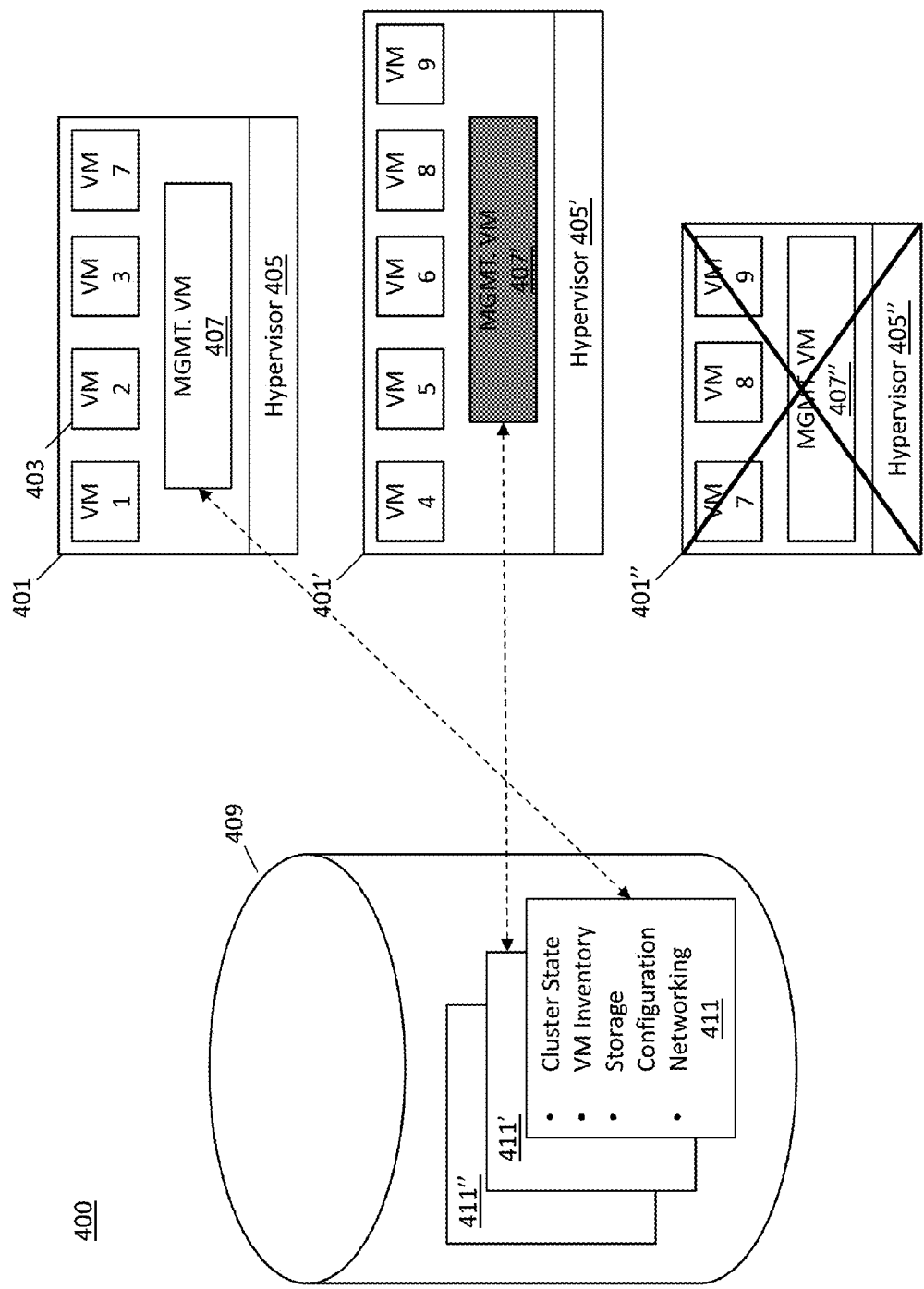

FIG. 8D illustrates the designation of active management virtual machine instances 407, 407' for replacing the management functionality of the failing management virtual machine instance 407". In FIG. 8D, the user virtual machines VM7, VM8 and VM9 that were originally being serviced by the failing management virtual machine 407" are reinstated at the nodes 401, 401' having their designated active management virtual machine instance 407, 407'. The leader management virtual machine instance 407' at node 401' now provides management functionality to user virtual machines VM8 and VM9 while the management virtual machine instance 407 at node 401 provides management functionality to user virtual machine VM7.

As illustrated in FIG. 8D, the user virtual machines VM7, VM8 and VM9 being previously being serviced by the failing management virtual machine instance 407are reinstated at the nodes 401, 401' at which their assigned management virtual machine instances 407, 407' are located.

After the workload of the failing management virtual machine 407" is distributed to the designated active management virtual machine instances 407, 407', the active management virtual machine instances 407, 407' in the networked virtualization environment 400 may determine whether the failing management virtual machine 407" instance is recovered. If it is determined that the failing management virtual machine 407" has not been recovered, then the active management virtual machine instances 407, 407' may continue to periodically check whether the failing management virtual machine instance 407" is running again.

Figure 8E:
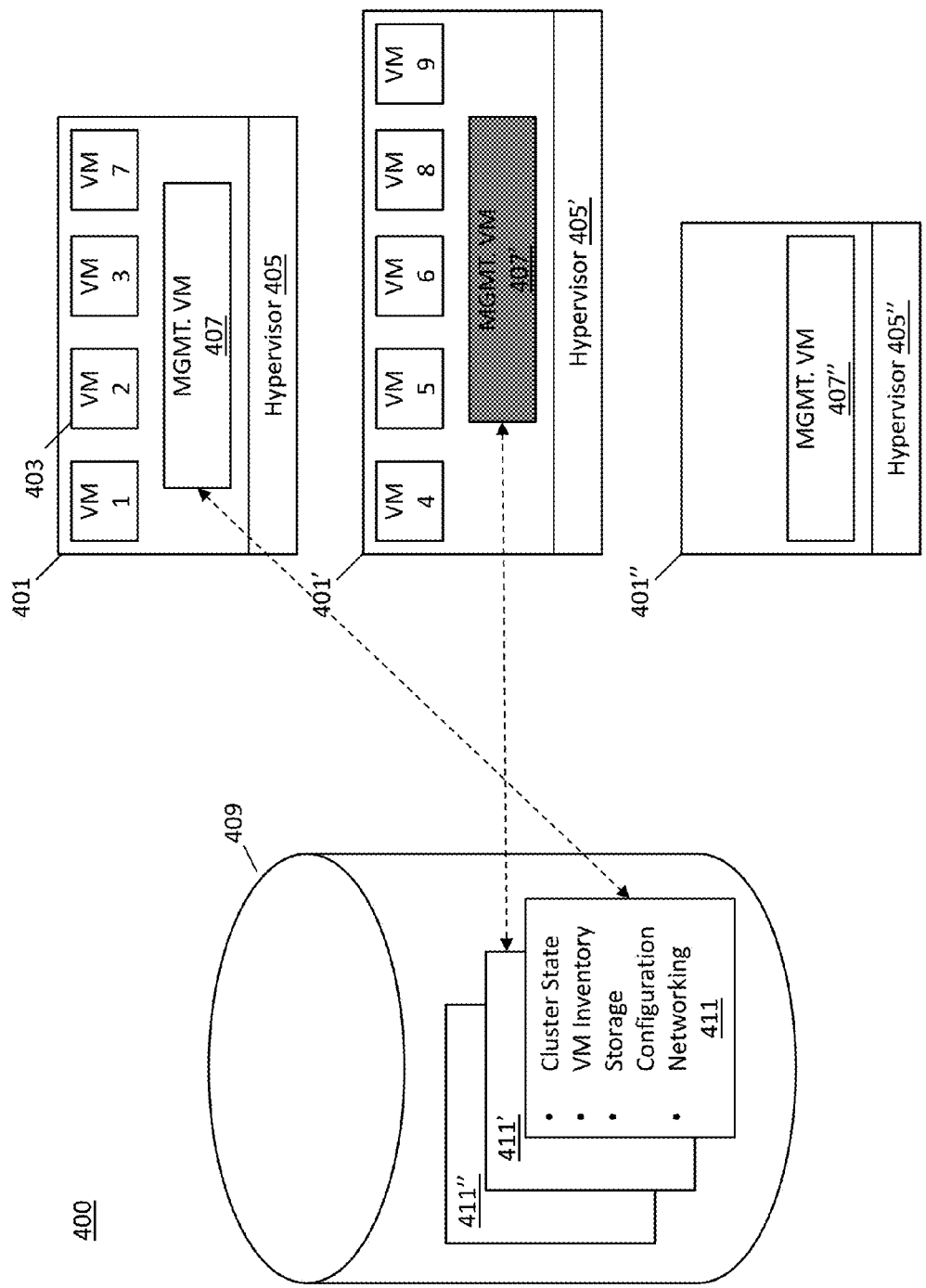

FIG. 8E depicts the networked virtualization environment after the failing management virtual machine instance 407" has recovered. As depicted in FIG. 8E, when the previously failing management virtual machine instance 407" is first recovered on its original node 401', it is no longer providing virtual machine management functionality to user virtual machines VM7, VM8 and VM9 because virtual machine management functionality for those user virtual machines VM7, VM8 and VM9 was replaced by the other active management virtual machine instances 407, 407' in the cluster 400.

Figure 8F:
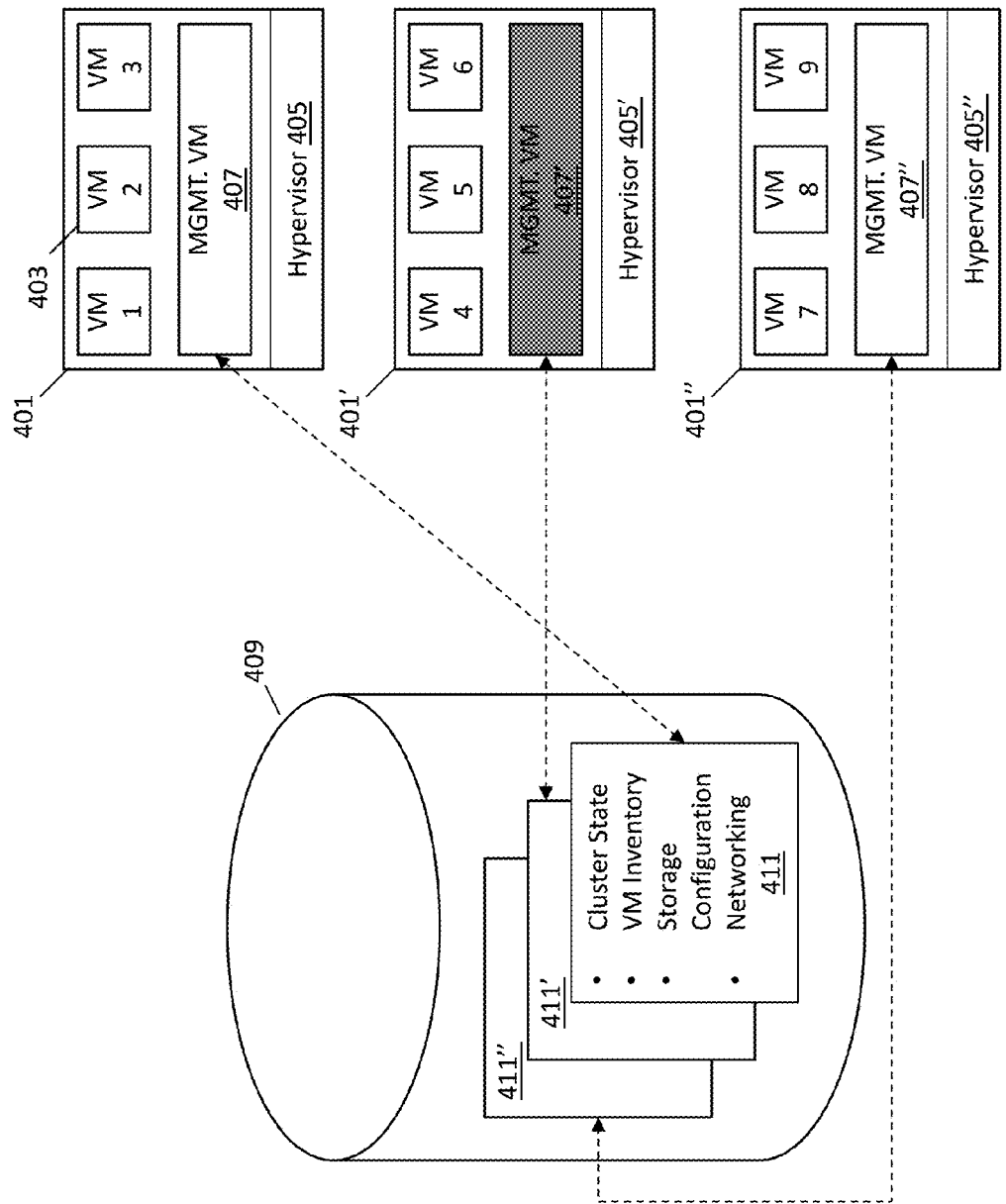

After the failing management virtual machine instance 407" has recovered, the user virtual machines VM7, VM8 and VM9 may be optionally reassigned to the recovered management virtual machine instance 407" as illustrated in FIG. 8F. Alternatively, the user virtual machines VM7, VM8, and VM9 being serviced by the failing management virtual machine instance 407" prior to failure may continue to be serviced by their newly assigned management virtual machine instances 407, 407' until the cluster 400 otherwise decides to redistribute user virtual machines based on workload.

Reassignment of the user virtual machines VM7, VM8 and VM9 may be accomplished by migrating the user virtual machines VM7, VM8 and VM9 back to the node 401" where the recovered management virtual machine instance 407" is located as depicted in FIG. 8F. Migration of user virtual machines VM7, VM8 and VM9 occurs because replacement of management functionality for the failing management virtual machine instance 407" involved reinstatement of those user virtual machines at different nodes 401, 401'.

As mentioned above, and as depicted in FIGS. 7A-F and 8A-F, by establishing a management virtual machine instance on every node within the networked virtualization environment and providing all management virtual machines access to the information pertaining to virtual machine management in a corresponding shard of the distributed database, a management virtual machine instance may take over the virtual machine management functionality of another management virtual machine instance whenever it fails. This prevents the absence of virtual machine management functionality during periods of management virtual machine failure thereby eliminating the errors and unintended behavior for the networked virtualization environment associated with use of a central management virtual machine.

Although the above mechanism for providing distributed management in a networked virtualization environment has been described in the context of providing distributed management for virtual machines and their corresponding virtual machine management data, it is important to note that the mechanism for providing distributed management in a networked virtualization environment may be extended to provide distributed management for any virtualization component in the networked virtualization environment.

For example, in addition to storing a subset of virtual machine management data in a corresponding shard of a distributed database, a management virtual machine instance may store management data for any virtualization component in the networked virtualization. Likewise, in addition to replacing virtual machine management functionality of a failed management virtual machine instance by one or more active management virtual machine instances, any virtualization component management functionality of a failed management virtual machine instance may be replaced by the one or more active management virtual machine instances.

System Architecture

Figure 9:
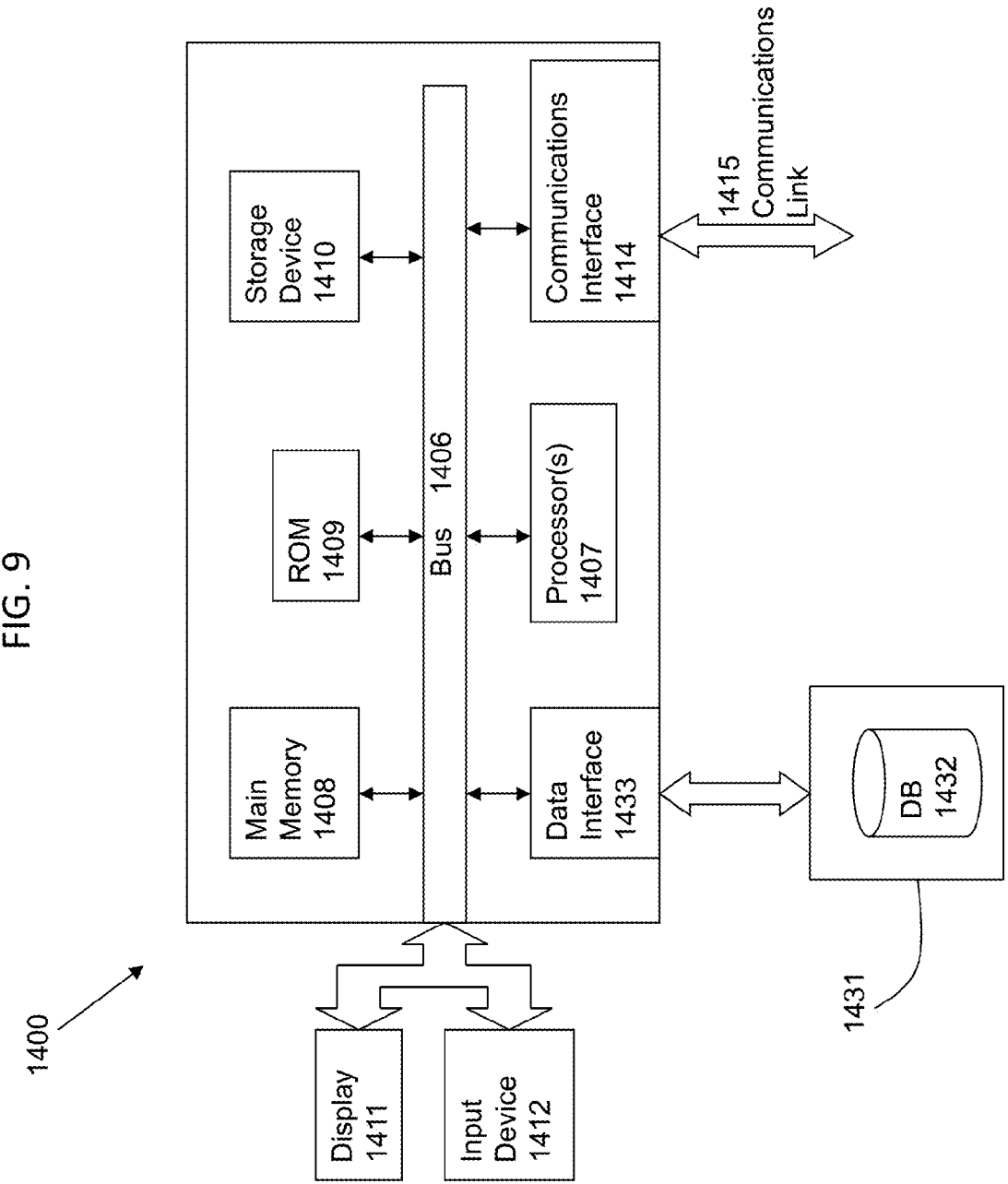
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for handling failure in a networked virtualization environment having distributed virtual machine management, comprising:
    identifying a failed management virtual machine instance of a plurality of management virtual machine instances in the networked virtualization environment,
        wherein the networked virtualization environment comprises a plurality of nodes, where a node of the plurality of nodes comprises a hypervisor, one or more virtualization components and a management virtual machine instance that runs on top of the hypervisor,
        wherein each management virtual machine instance of the plurality of management virtual machine instances services a subset of virtualization components in the networked virtualization environment, and
        wherein a management virtual machine instance of the plurality of management virtual machine instances has access to a corresponding shard of a distributed database for the networked virtualization environment, the corresponding shard storing a subset of management data for virtualization components managed by the management virtual machine instance;
    designating one or more active management virtual machine instances of the plurality of management virtual machine instances for replacing virtualization component management functionality of the failed management virtual machine instance,
        wherein the one or more active management virtual machine instances replace virtualization component management functionality of the failed management virtual machine instance by each accessing its subset of management data in its corresponding shard of the distributed database, and
        wherein the one or more active management virtual machine instances are configured to replace virtualization component management functionality of another management virtual machine instance whenever the other management virtual machine instance fails; and
    distributing a workload of the failed management virtual machine instance amongst the one or more active management virtual machine instances in response to identifying the failed management virtual machine instance.

2. The method of claim 1, wherein the subset of virtualization components in the networked virtualization environment being serviced by each management virtual machine instance comprises virtual machines.

3. The method of claim 2, wherein the subset of management data for the networked virtualization environment being stored in the corresponding shard of a distributed database for each management virtual machine instance comprises virtual machine management data.

4. The method of claim 1, further comprising:
    determining whether the failed management virtual machine instance has recovered; and
    reassigning the workload of the failed management virtual machine instance when the failed management virtual machine instance has recovered.

5. The method of claim 1, wherein identifying the failed management virtual machine instance comprises:
    identifying a state of the networked virtualization environment by the one or more active management virtual machine instances in a corresponding shard of the distributed database.

6. The method of claim 1, wherein identifying the failed management virtual machine instance comprises:
    utilizing pings between the failed management virtual machine instance and the one or more active management virtual machine instances.

7. The method of claim 1, wherein the failed management virtual machine instance has itself failed rather than a node at which the failed management virtual machine instance resides.

8. The method of claim 7, wherein distributing the workload of the failed management virtual machine instance amongst the one or more active management virtual machine instances comprises migrating virtual machine management functionality for one or more user virtual machines previously serviced by the failed management virtual machine instance to the one or more active management virtual machine instances.

9. The method of claim 1, wherein the failed management virtual machine instance resides on a failing node of the networked virtualization environment.

10. The method of claim 9, wherein distributing the workload of the failed management virtual machine instance amongst the one or more active management virtual machine instances comprises migrating one or more user virtual machines previously serviced by the failed management virtual machine instance to nodes at which the one or more active management virtual machine instances reside.

11. The method of claim 1, wherein designating the one or more active management virtual machine instances for replacing the failing management virtual machine instance comprises:
- electing an active management virtual machine instance as a leader management virtual machine instance; and
- designating the one or more active management virtual machine instances for replacing the failing management virtual machine instance by the leader management virtual machine instance.

12. The method of claim 11, wherein designating the one or more active management virtual machine instances is based on a current workload of the one or more active management virtual machine instances.

13. The method of claim 11, wherein designating the one or more active management virtual machine instances is based on a workload of the failed management virtual machine instance.

14. A computer program product embodied on a non-transitory computer readable medium, the non-transitory computer readable medium having stored thereon a sequence of instructions which, when executed by a processor causes the processor to execute a method for handling failure in a networked virtualization environment having distributed virtual machine management, comprising:
- identifying a failed management virtual machine instance of a plurality of management virtual machine instances in the networked virtualization environment,
  - wherein the networked virtualization environment comprises a plurality of nodes, where a node of the plurality of nodes comprises a hypervisor, one or more virtualization components and a management virtual machine instance that runs on top of the hypervisor,
  - wherein each management virtual machine instance of the plurality of management virtual machine instances services a subset of virtualization components in the networked virtualization environment, and
  - wherein a management virtual machine instance of the plurality of management virtual machine instances has access to a corresponding shard of a distributed database for the networked virtualization environment, the corresponding shard storing a subset of management data for virtualization components managed by the management virtual machine instance;
- designating one or more active management virtual machine instances of the plurality of management virtual machine instances for replacing virtualization component management functionality of the failed management virtual machine instance,
  - wherein the one or more active management virtual machine instances replace virtualization component management functionality of the failed management virtual machine instance by each accessing its subset of management data in its corresponding shard of the distributed database, and
  - wherein the one or more active management virtual machine instances are configured to replace virtualization component management functionality of another management virtual machine instance whenever the other management virtual machine instance fails; and
- distributing a workload of the failed management virtual machine instance amongst the one or more active management virtual machine instances in response to identifying the failed management virtual machine instance.

15. The computer program product of claim 14, wherein the subset of virtualization components in the networked virtualization environment being serviced by each management virtual machine instance comprises virtual machines.

16. The computer program product of claim 15, wherein the subset of management data for the networked virtualization environment being stored in the corresponding shard of a distributed database for each management virtual machine instance comprises virtual machine management data.

17. The computer program product of claim 14, further comprising:
- determining whether the failed management virtual machine instance has recovered; and
- reassigning the workload of the failed management virtual machine instance when the failed management virtual machine instance has recovered.

18. The computer program product of claim 14, wherein identifying the failed management virtual machine instance comprises:
- identifying a state of the networked virtualization environment by the one or more active management virtual machine instances in a corresponding shard of the distributed database.

19. The computer program product of claim 14, wherein identifying the failed management virtual machine instance comprises:
- utilizing pings between the failed management virtual machine instance and the one or more active management virtual machine instances.

20. The computer program product of claim 14, wherein the failed management virtual machine instance itself has failed rather than a node at which the failed management virtual machine instance resides.

21. The computer program product of claim 20, wherein distributing the workload of the failed management virtual machine instance amongst the one or more active management virtual machine instances comprises migrating virtual machine management functionality for one or more user virtual machines previously serviced by the failed management virtual machine instance to the one or more active management virtual machine instances.

22. The computer program product of claim 14, wherein the failed management virtual machine instance resides on a failing node of the networked virtualization environment.

23. The computer program product of claim 22, wherein distributing the workload of the failed management virtual machine instance amongst the one or more active management virtual machine instances comprises migrating one or more user virtual machines previously serviced by the failed management virtual machine instance to nodes at which the one or more active management virtual machine instances reside.

24. The computer program product of claim 14, wherein designating the one or more active management virtual machine instances for replacing the failing management virtual machine instance comprises:
- electing an active management virtual machine instance as a leader management virtual machine instance; and
- designating the one or more active management virtual machine instances for replacing the failing management virtual machine instance by the leader management virtual machine instance.

25. The computer program product of claim 24, wherein designating the one or more active management virtual machine instances is based on a current workload of the one or more active management virtual machine instances.

26. The computer program product of claim 24, wherein designating the one or more active management virtual machine instances is based on a workload of the failed management virtual machine instance.

27. A system for providing distributed virtual machine management to a networked virtualization environment, comprising:
   a plurality of nodes, wherein each node of the plurality of nodes comprises a hypervisor and user virtual machines;
   a management virtual machine instance on each of the plurality of nodes, wherein each management virtual machine instance runs above a corresponding hypervisor and services a subset of virtualization components in the networked virtualization environment;
   a distributed database, wherein the distributed database is partitioned into shards corresponding to each of the management virtual machine instances, each shard comprising a subset of management data for the networked virtualization environment and each shard being accessible by its corresponding management virtual machine instance; and
   wherein one or more active management virtual machine instances in the networked virtualization environment replaces virtual machine management functionality of a failed management virtual machine instance in the networked virtualization environment by each accessing its corresponding shard in the distributed database.

\* \* \* \* \*